(12) United States Patent
Williams et al.

(10) Patent No.: US 11,465,631 B2
(45) Date of Patent: Oct. 11, 2022

(54) PERSONALIZATION SYSTEM AND METHOD FOR A VEHICLE BASED ON SPATIAL LOCATIONS OF OCCUPANTS' BODY PORTIONS

(71) Applicant: Tesla, Inc., Austin, TX (US)

(72) Inventors: Blair Williams, Cupertino, CA (US); Adnan Esmail, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/211,901

(22) Filed: Dec. 6, 2018

(65) Prior Publication Data

US 2019/0176837 A1    Jun. 13, 2019

Related U.S. Application Data

(60) Provisional application No. 62/596,413, filed on Dec. 8, 2017.

(51) Int. Cl.
*B60W 40/08* (2012.01)
*B60R 16/037* (2006.01)
(Continued)

(52) U.S. Cl.
CPC ......... *B60W 40/08* (2013.01); *B60H 1/00742* (2013.01); *B60R 16/037* (2013.01);
(Continued)

(58) Field of Classification Search
CPC ... B60R 16/037; B60R 21/0552; B60N 2/002; B60H 1/00742; B60H 1/00871;
(Continued)

(56) References Cited

U.S. PATENT DOCUMENTS

| 4,625,329 A | * | 11/1986 | Ishikawa | B60R 1/07 180/271 |
| 9,290,174 B1 | * | 3/2016 | Zagorski | B60W 30/09 |

(Continued)

FOREIGN PATENT DOCUMENTS

| DE | 102007023141 A1 | * | 11/2008 | ........... B60R 16/037 |
| DE | 102008018397 A1 | * | 10/2009 | ......... B60H 1/00871 |

(Continued)

OTHER PUBLICATIONS

Tesla Model S Software Release Notes, v1.13.16, (c) 2012 Tesla Motors Inc., 3 pages (Year: 2012).*

(Continued)

*Primary Examiner* — David A Testardi
(74) *Attorney, Agent, or Firm* — Knobbe, Martens, Olson & Bear, LLP

(57) ABSTRACT

A personalization system for a vehicle includes an image-capture device configured to capture a plurality of images of one or more occupants in the vehicle and control circuitry configured to estimate a plurality of Z-heights of a plurality of body portions of each of the one or more occupants from a reference position in the vehicle, based on the plurality of images captured from the image-capture device, determine an associative relationship between the plurality of Z-heights of the plurality of body portions of each of the one or more occupants in the vehicle and a plurality of in-vehicle systems, based on defined user-preferences, and control the plurality of in-vehicle systems to direct an output from a corresponding in-vehicle system to a specific body portion of each of the one or more occupants in the vehicle, based on the estimated plurality of Z-heights and the determined associative relationship.

19 Claims, 12 Drawing Sheets

(51) Int. Cl.
| | |
|---|---|
| *B60W 50/02* | (2012.01) |
| *G06F 3/16* | (2006.01) |
| *B60W 10/30* | (2006.01) |
| *H04W 4/44* | (2018.01) |
| *G06V 20/59* | (2022.01) |
| *B60H 1/00* | (2006.01) |
| *H04S 7/00* | (2006.01) |
| *H04W 4/40* | (2018.01) |
| *H04W 4/90* | (2018.01) |

(52) U.S. Cl.
CPC ............ *B60W 10/30* (2013.01); *B60W 50/02* (2013.01); *G06F 3/165* (2013.01); *G06V 20/593* (2022.01); *H04S 7/303* (2013.01); *H04W 4/44* (2018.02); *B60W 2040/0872* (2013.01); *B60W 2420/42* (2013.01); *H04W 4/40* (2018.02); *H04W 4/90* (2018.02)

(58) Field of Classification Search
CPC ........... G06K 9/00362; G06K 9/00832; G06K 9/00845; G06K 9/00838; B60W 40/08; B60W 2040/0818; B60W 2040/0827; B60W 2040/0836; B60W 2040/0845; B60W 2040/0872; B60W 10/30; H04S 7/303; G06V 40/166; G10K 11/004
See application file for complete search history.

(56) References Cited

U.S. PATENT DOCUMENTS

| | | | | |
|---|---|---|---|---|
| 9,707,913 | B1* | 7/2017 | Ochiai | B60N 2/0248 |
| 10,106,080 | B1* | 10/2018 | Hassani | B60N 2/90 |
| 2006/0253241 | A1* | 11/2006 | Bothe | B60R 21/01536 |
| | | | | 701/49 |
| 2008/0037803 | A1* | 2/2008 | Breed | H04R 5/02 |
| | | | | 381/86 |
| 2008/0158096 | A1* | 7/2008 | Breed | G01S 7/417 |
| | | | | 345/7 |
| 2011/0098894 | A1* | 4/2011 | Zeng | B60J 3/0204 |
| | | | | 701/49 |
| 2012/0086249 | A1* | 4/2012 | Hotary | B60N 2/838 |
| | | | | 297/284.3 |
| 2012/0327232 | A1* | 12/2012 | Yang | G06K 9/00845 |
| | | | | 348/148 |
| 2013/0166096 | A1* | 6/2013 | Jotanovic | G01C 21/3617 |
| | | | | 701/1 |
| 2014/0096003 | A1* | 4/2014 | Vu | G06F 17/00 |
| | | | | 715/727 |
| 2014/0112554 | A1* | 4/2014 | Chiu | B60R 25/25 |
| | | | | 382/118 |
| 2014/0294210 | A1* | 10/2014 | Healey | G06F 3/165 |
| | | | | 381/302 |
| 2015/0066284 | A1* | 3/2015 | Yopp | B60W 50/10 |
| | | | | 701/29.2 |
| 2015/0105976 | A1* | 4/2015 | Shikii | B60H 1/00742 |
| | | | | 701/36 |
| 2015/0379362 | A1* | 12/2015 | Calmes | G06T 7/20 |
| | | | | 348/136 |
| 2016/0142852 | A1* | 5/2016 | Christoph | H04S 7/303 |
| | | | | 381/302 |
| 2016/0165337 | A1* | 6/2016 | Trestain | H04S 7/303 |
| | | | | 381/387 |
| 2016/0195405 | A1* | 7/2016 | Kreifeldt | G01C 21/3617 |
| | | | | 701/533 |
| 2016/0341567 | A1* | 11/2016 | Delaruelle | G01C 21/3617 |
| 2016/0347271 | A1* | 12/2016 | Kuehne | B60N 2/806 |
| 2017/0108864 | A1* | 4/2017 | Wiklinska | G06K 9/00832 |
| 2017/0140232 | A1* | 5/2017 | Banno | A61B 5/1114 |
| 2018/0065582 | A1* | 3/2018 | Miller | B60R 21/01552 |
| 2018/0086179 | A1* | 3/2018 | Mizuno | B60H 1/00021 |
| 2018/0105023 | A1* | 4/2018 | Nakamura | B60R 11/0229 |
| 2018/0157459 | A1* | 6/2018 | Turner | H04R 3/12 |
| 2018/0206036 | A1* | 7/2018 | Laack | H04R 29/002 |
| 2018/0208017 | A1* | 7/2018 | Hernandez | B60H 1/00871 |
| 2018/0354440 | A1* | 12/2018 | Pouliquen | G06K 9/00288 |
| 2019/0054798 | A1* | 2/2019 | Nacer-Bey | B60H 1/00742 |
| 2019/0077346 | A1* | 3/2019 | Pankow | B60R 25/305 |
| 2019/0084372 | A1* | 3/2019 | Gallagher | A61B 5/0077 |
| 2019/0110729 | A1* | 4/2019 | Yamataka | B60W 30/182 |
| 2019/0168575 | A1* | 6/2019 | Perez Barrera | B60H 1/00871 |
| 2019/0171409 | A1* | 6/2019 | Boulanger | G06F 16/638 |
| 2019/0176837 | A1* | 6/2019 | Williams | B60W 50/02 |
| 2019/0210608 | A1* | 7/2019 | Shikii | B60K 28/04 |
| 2019/0299743 | A1* | 10/2019 | Yamauchi | G01B 11/00 |
| 2020/0171977 | A1* | 6/2020 | Jales Costa | G06K 9/00838 |
| 2021/0174065 | A1* | 6/2021 | Kumagai | B60Q 9/00 |

FOREIGN PATENT DOCUMENTS

| | | | | | |
|---|---|---|---|---|---|
| FR | 3067309 | A1 | * | 12/2018 | ......... G06K 9/00288 |
| JP | 60158303 | A | * | 8/1985 | ............. B60R 1/07 |
| JP | 60158304 | A | * | 8/1985 | ............. B60R 1/07 |
| JP | 60174314 | A | * | 9/1985 | ......... B60H 1/00742 |
| JP | 60179357 | A | * | 9/1985 | ............. B60R 1/07 |
| JP | 2003341337 | A | * | 12/2003 | |
| JP | 2004155408 | A | * | 6/2004 | |
| JP | 2005112231 | A | * | 4/2005 | ............. B60R 1/07 |
| JP | 2006219009 | A | * | 8/2006 | ......... B60H 1/00742 |
| JP | 2006327526 | A | * | 12/2006 | ............. B60R 1/07 |
| JP | 2007106290 | A | * | 4/2007 | ............. B60R 1/07 |
| JP | 2009273511 | A | * | 11/2009 | |
| JP | 2010108046 | A | * | 5/2010 | |

OTHER PUBLICATIONS

Wikipedia article, "Sound from ultrasound", Old revision dates Oct. 22, 2017, 10 pages (Year: 2017).*

EPO machine translation of FR 3067309 A1 (original FR document published Dec. 14, 2018) (Year: 2018).*

* cited by examiner

PERSONALIZATION SYSTEM AND METHOD FOR A VEHICLE BASED ON SPATIAL LOCATIONS OF OCCUPANTS' BODY PORTIONS

CROSS-REFERENCE TO RELATED APPLICATION

The present U.S. Utility Patent Application claims priority pursuant to 35 U.S.C. § 119(e) to U.S. Provisional Application No. 62/596,413, entitled "Personalization System and Method for a Vehicle Based on Spatial Locations of Occupants' Body Portions", filed Dec. 8, 2017, which is hereby incorporated herein by reference in its entirety and made part of the present U.S. Utility Patent Application for all purposes.

TECHNICAL FIELD

Various embodiments of the disclosure relate to automotive technologies. More specifically, various embodiments of the disclosure relate to personalizing vehicle systems to maximize the user experience and also efficiently use vehicle resources, including stored energy, based on spatial locations of vehicle occupants or portions of their.

BACKGROUND

Vehicle occupant experience and personalization is an important aspect for creating a positive vehicle experience. Currently, vehicle personalization systems and technologies are limited to standard vehicle settings or predefined customizations, where variations in physical body dimensions of different occupants play a negligible role. For example, different occupants of a vehicle may have different physical body sizes or shapes. Therefore, when such different occupants are seated in the vehicle, standard settings or even preset user preferences for different vehicular systems, e.g., climate control systems and in-vehicle audio systems, may not be effectively tailored to each occupant or the current situation. Further, a change in one customized vehicle setting, for example, a seat position, for one occupant may interfere with other settings related to the different vehicular systems for the same occupant. This may hamper the overall in-vehicle comfort and entertainment experience for the occupant, for example, a driver. Further, even a customized setting for one occupant, for example, a driver, may not have no impact on other occupants or worse, may reduce the experience for other occupants in the vehicle. For example, if the driver typically desires all of the speakers to be directed towards the driver's ears to maximize sound quality, the passenger have a reduced experience.

Besides impacting the user experience, resources may not be directed in an efficient manner. For example, in an electric vehicle, battery resources may be used to control air temperature. Maximizing the comfort felt by the vehicle occupants allows fewer resources to be used, thereby decreasing energy usage and increasing vehicle range. Thus, an advanced, intelligent, and an automatic real-time or near-real-time personalization system may be desired for vehicles for enhanced in-vehicle comfort and entertainment experience for one or more vehicle occupants.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A personalization system and method for a vehicle based on the spatial location of vehicle occupants or portions of their of body is substantially shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed personalization system and method for a vehicle based on spatial locations of body portions of occupants in the vehicle. Exemplary aspects of the disclosure may include a personalization system that may include an image-capture device and circuitry in an in-vehicle electronic device. The disclosed personalization system, for example, the in-vehicle electronic device, increases improves an overall in-vehicle comfort and entertainment experience for the vehicle occupants. The personalization system provides an advanced, intelligent, and an automatic personalization of in-vehicle systems in real-time or near-real time for enhanced and consistent in-vehicle comfort and entertainment experience, both before and during a drive.

Figure 1:
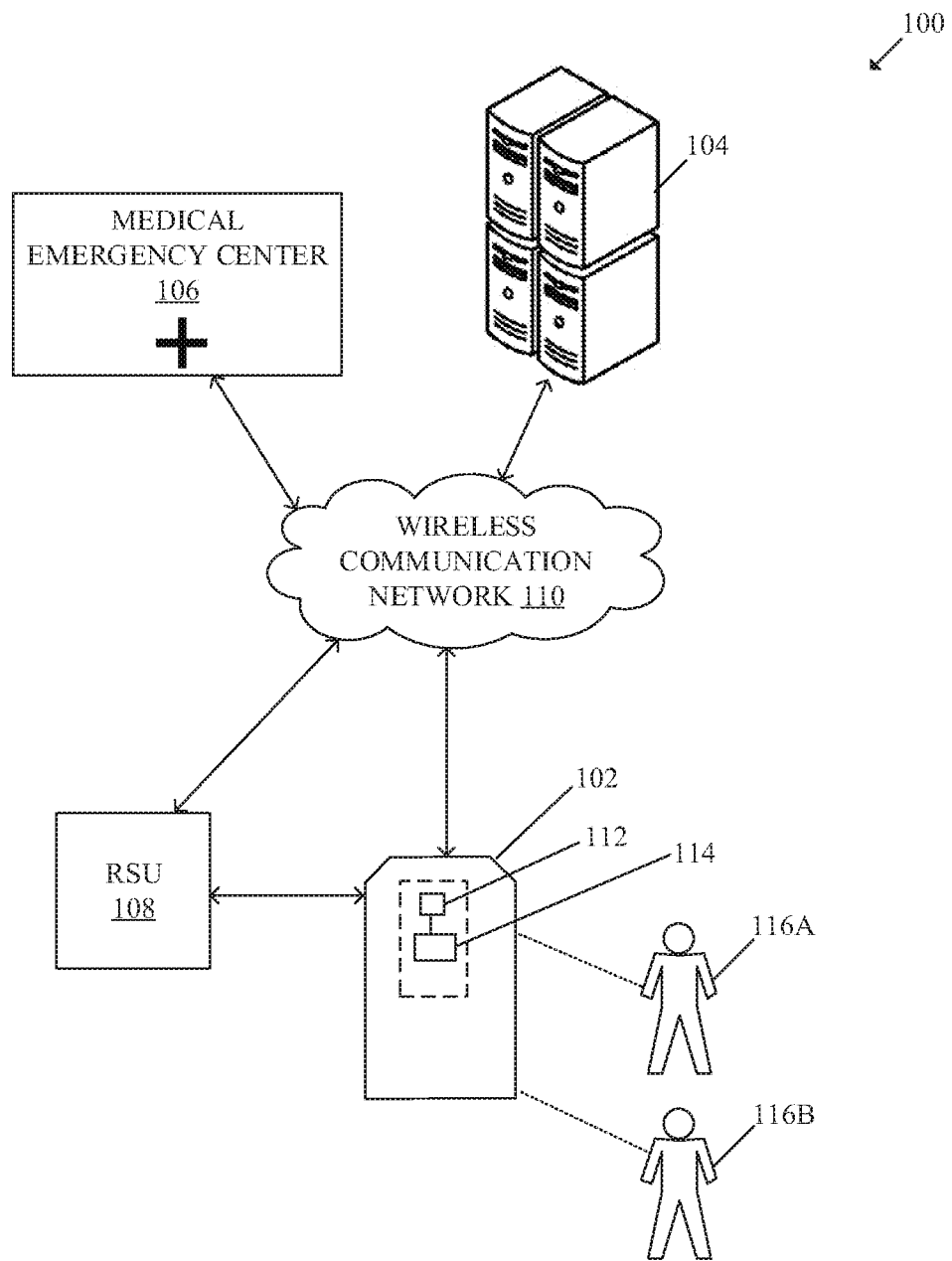
FIG. 1 is a block diagram that illustrates a network environment for personalization system for a vehicle, in accordance with an embodiment of the disclosure.

FIG. 1 is a block diagram that illustrates a network environment for personalization system for a vehicle, in accordance with an embodiment of the disclosure. With reference to FIG. 1, there is shown an exemplary network environment 100. The exemplary network environment 100 may include a vehicle 102, a server 104, a medical emergency center 106, a road side unit (RSU) 108, and a wireless communication network 110.

The vehicle 102 may include an image-capture device 112 and an in-vehicle electronic device 114. There is further shown a first user 116A and a second user 116B associated with the vehicle 102. The image-capture device 112 may be installed in the interior of the vehicle 102 to capture a plurality of images or a video of one or more occupants, such as the first user 116A and the second user 116B, in the vehicle 102. The in-vehicle electronic device 114 may refer to an in-vehicle infotainment (IVI) system or an electronic control unit (ECU) of the vehicle 102.

The vehicle 102 may be an autonomous vehicle or a semi-autonomous vehicle, for example, as defined by National Highway Traffic Safety Administration (NHTSA). In some embodiments, the vehicle 102 may be a non-autonomous vehicle. Examples of the vehicle 102 include, but are not limited to, an electric vehicle, a hybrid vehicle, a gas-combustion vehicle, and/or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. There are a plurality of differ categories or levels of vehicles of what is considered to be semi-autonomous and autonomous, for example the classification according to NHTSA. The personalization system and method of the present disclosure may be applied to the plurality of differ categories or levels of vehicles that includes non-autonomous to fully-autonomous vehicles.

The server 104 may comprise suitable logic, circuitry, interfaces, and/or code that may be configured to establish a communication channel with one or more vehicles, such as the vehicle 102. The server 104 may be configured to receive information, such as user profiles, from various vehicles, such as the vehicle 102. The server 104 may be a cloud server, a web server, a database server, a file server, an application server, or a combination thereof. The server 104 may be implemented by use of several technologies that are well known to those skilled in the art.

The medical emergency center 106 may refer to a service provider of an ambulance or other specialized vehicles equipped to handle various medical emergencies. The medical emergency center 106 may have a facility, such as a server or a communication medium, to receive health alert notifications or emergency notifications from external devices or vehicles, such as the vehicle 102. The medical emergency center 106 may also be associated with an emergency department of a hospital or medical clinic that may have a facility, such as a server or a communication medium, to receive health alert notifications or emergency notifications from registered external devices or vehicles, such as the vehicle 102. When the health alert notifications are received, the medical emergency center 106 may route the health alert to suitable department, doctors, and/or other personnel to make arrangements or initiate preparation for the treatment of a patient, such as the first user 116A.

The road side unit (RSU) 108 may comprise suitable logic, circuitry, interfaces, and/or code that may be configured to communicate with the vehicle 102. The RSU 108 may communicate with the vehicle 102 via a dedicated short-range communication (DSRC) channel or other short or medium range wireless communication channel. The RSU 108 may also communicate with the server 104 via the wireless communication network 110. The RSU 108 may be configured to communicate (receive and/or transmit) various types of information from/to a wireless communication system of the vehicle 102.

The wireless communication network 110 may include a long range communication medium through which one or more vehicles, such as the vehicle 102, may communicate with the server 104 or external communication devices, such as the RSU 108, or registered mobile devices. Examples of the wireless communication network 110 may include, but are not limited to, the Internet, Internet-based mobile ad hoc networks (IMANET), a cellular network, such as a 3G, 4G, or 5G network, a cloud network, and/or a Wide Area Network (WAN). Various devices in the network environment 100 may be configured to connect to the wireless communication network 110, in accordance with various wireless communication protocols. Examples of such wireless communication protocols may include, but are not limited to, IEEE 802.11, 802.11x, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), LTE, File Transfer Protocol (FTP), ZigBee, EDGE, Li-Fi, and/or other wireless communication protocols.

The image-capture device 112 may comprise suitable logic, circuitry, interfaces, and/or code that may be configured to capture a plurality of images or a video of the one or more occupants, such as the first user 116A and/or the second user 116B, in the vehicle 102. The image-capture device 112 is positioned in the interior of the vehicle 102 such that a field-of-view of the image-capture device 112 is suitable to capture self-portrait images that include at least a face portion of all occupants (including driver and passengers) in the vehicle 102. Thus, the image-capture device 112 may also be referred to as a selfie camera. In some embodiments, the image-capture device 112 may be installed in the vicinity of the front mirror of the vehicle 102, as shown, for example, in FIG. 3A. Examples of the image-capture device 112 may include, but are not limited to, an image sensor, a wide-angle camera, an action camera, a closed-circuit television (CCTV) camera, a camcorder, a time-of-flight camera (ToF camera), a night-vision camera, and/or other such in-vehicle cameras or sensors.

The in-vehicle electronic device 114 may comprise suitable logic, circuitry, interfaces, and/or code that may be configured to estimate a plurality of Z-heights of a plurality of body portions of each of the one or more occupants from a reference position in the vehicle 102. The plurality of Z-heights may be estimated based on the plurality of images captured from the image-capture device 112. The in-vehicle electronic device 114 may be configured to access sensor data from the image-capture device 112, one or more vehicle sensors, and/or other vehicle data associated with the vehicle 102. The sensor data may be accessed by the in-vehicle electronic device 114, via an in-vehicle network, such as a vehicle area network (VAN) and/or in-vehicle data bus, such as a controller area network (CAN) bus. In accordance with an embodiment, the in-vehicle electronic device 114 may be configured to communicate with various other vehicles in a vehicle-to-vehicle (e.g., a V2V communication, external communication devices (such as the RSU 108) and/or a cloud server (such as the server 104) via the wireless communication channel or via the wireless communication network 110.

In operation, a driver, such as the first user 116A, may open a vehicle door to enter into the vehicle 102. The image-capture device 112 may be activated when the vehicle door is opened. The image-capture device 112 may be configured to capture at least one or more images or a video of the first user 116A. In some embodiments, the image-capture device 112 may execute at least one or more face detection algorithms on the captured one or more images or the video to extract facial features for identification of a user, such as the first user 116A. The image-capture device 112 may be configured to identify a driver profile associated with the first user 116A based on facial recognition of the first user 116A. In some embodiments, instead of facial recognition, other user identification methods, for example, human identification from a body shape based on human object boundary or silhouette matching, may be used. In some embodiments, the in-vehicle electronic device 114, for example, an infotainment head unit or an ECU, may be configured to receive the captured one or more images or the video of the first user 116A from the image-capture device 112, via an in-vehicle network. In such a case, the in-vehicle electronic device 114 may be configured to process the captured one or more images or the video of the first user 116A to identify the driver profile associated with the first user 116A based on facial recognition of the first user 116A.

In cases where the first user 116A is identified based on facial recognition, a profile associated with the identified first user 116A may be searched in a user profile database stored in a memory device of the in-vehicle electronic device 114. In cases where the profile associated with the identified first user 116A is found, the in-vehicle electronic device 114 may be configured to communicate an audio signal to a vehicle audio system to output a customized audio greeting to the first user 116A. For example, the profile of first user 116A may be the driver profile of "Fredrick". The first user 116A may be notified of recognition confirmation with custom audio greeting, "Hello Fredrick" via at least one of the audio speakers of the vehicle audio system.

In accordance with an embodiment, the in-vehicle electronic device 114 may be configured to execute a first level of customization in the vehicle 102 based on the defined user-preferences in the driver profile of the first user 116A. For example, the driver seat, vehicle mirrors (e.g. outer rear view mirrors (ORVMs), front mirror, and the like), heating, cooling, and driving mode preferences, may be adjusted in accordance with the user preferences in the driver profile of the first user 116A. The in-vehicle electronic device 114 may be configured to communicate a plurality of control signals to one or more other in-vehicle systems or ECUs to initiate the adjustments in accordance with the user preferences in the driver profile of the first user 116A.

In cases where the first user 116A is not identified based on facial recognition, the in-vehicle electronic device 114 may be configured to mark the first user 116A as a new user, and a request to set a profile may be generated on a display of an infotainment head unit. In certain scenarios, a plurality of users, such as the first user 116A and the second user 116B, may board the vehicle 102 together for a ride. In such scenarios, the in-vehicle electronic device 114 may be configured to communicate audio signals to the vehicle audio system to output customized audio greetings for the plurality of users based on a concurrent identification of the plurality of users. For example, in addition to custom audio greeting to the first user 116A, the second user 116B may also be greeted as, "Hello Nick, good to see you after a long time", via an audio speaker that is in vicinity of the second user 116B. The in-vehicle electronic device 114 may be configured to store a time or a day of boarding, a duration of a trip (or journey), a seating position for each identified user during each trip in the memory. The in-vehicle electronic device 114 may be further configured to track and store changes in seating position, user behavior, or body movement for each identified user during each trip for later analysis. Thus, when the second user 116B is detected to board after a certain period of time, for example, 2-3 months based on the stored last day of boarding for the second user 116B, the custom audio greeting "Hello Nick, good to see you after a long time" is generated accordingly for a humanized in-vehicle experience.

In accordance with an embodiment, the in-vehicle electronic device 114 may be configured to estimate a plurality of Z-heights of a plurality of body portions of each of the one or more occupants (e.g., the first user 116A and the second user 116B). The plurality of Z-heights may be estimated from a reference position in the vehicle 102. Examples of the plurality of body portions for which the plurality of Z-heights are estimated, may include, but are not limited to a face portion, middle portion of a face from a left ear to a right ear, or other body portions. The plurality of Z-heights may be estimated based on the plurality of images captured by the image-capture device 112. The estimation of the plurality of Z-heights from the reference position in the vehicle 102, is described in detail, for example, in FIG. 3C. A Z-height of a body portion may correspond to a spatial location of the body portion, such as an occupant's head or ears, of a vehicle occupant in the vehicle when the user is in a seated position.

In accordance with an embodiment, the in-vehicle electronic device 114 may be configured to determine an associative relationship between the estimated plurality of Z-heights of the plurality of the body portions of each occupants in the vehicle 102 and a plurality of in-vehicle systems. Examples of the plurality of in-vehicle systems may include, but are not limited to the vehicle audio system and a Heating, Ventilation, and Air Conditioning (HVAC) system. In one example, a first Z-height of "X" centimeter (cm), may be estimated from the reference position in the vehicle 102 to one side (e.g., the lower side) of a face rectangle of the detected facial portion of a first occupant (such as the first user 116A). The first Z-height, for example, may be associated with the HVAC system of the vehicle 102. In another example, a second Z-height of "Y" centimeter (cm) from the reference position to the middle portion of the face rectangle of the first occupant (such as the first user 116A) may be estimated. The second Z-height, for example, may be associated with the vehicle audio system of the vehicle 102.

The in-vehicle electronic device 114 may be configured to control the plurality of in-vehicle systems to direct an output from a corresponding in-vehicle system of the plurality of in-vehicle systems to a specific body portion of the plurality of body portions of each of the one or more occupants in the vehicle 102. The output from a corresponding in-vehicle system may be directed to the specific body portion based on the estimated plurality of Z-heights and the determined associative relationship. In some embodiments, the plurality of in-vehicle systems may be controlled concurrently to direct a plurality of output from the plurality of in-vehicle systems to corresponding body portions of each of the one or more occupants in the vehicle 102.

For example, the in-vehicle electronic device 114 may be configured to control an angle of one or more vents of the HVAC system to direct an airflow toward a first body portion, such as the entire face portion, of the first occupant. The airflow may be directed toward the first body portion, such as the entire face portion, based on the estimated first Z-height (e.g., "X" cm) of the first body portion (i.e., the face portion) of the first occupant and the determined associative relationship that the first Z-height is associated with the HVAC system of the vehicle 102. The one or more vents of the HVAC system may correspond to vents that are controlled by one or more servo motors. The one or more servo motors may be coupled to the one or more vents of the HVAC system. The in-vehicle electronic device 114 may be configured to communicate a position control signal to the one or more servo-controlled vents to automatically control positioning and/or angle of the one or more servo-controlled vents in real time or near-real time. Thus, the positioning and/or angle of the one or more servo-controlled vents may be controlled in real time or near-real time in accordance to the estimated Z-height of the first body portion (e.g., the face portion) of the first occupant (e.g., the first user 116A).

In accordance with an embodiment, the image-capture device 112 may be configured to continuously or intermittently track a plurality of different spatial locations (in X, Y, and Z coordinates) of each face portion of the one or more occupants of the vehicle 102. In cases where a change in a spatial location is detected for one face portion or a plurality of face potions, the positioning and/or angle of the one or more servo-controlled vents may be updated in real time or near-real time to target the airflow to the changed spatial location of each face portion.

In another embodiment, instead of an image-capture device, a thermal sensor or imager may be used to determine portions of an individual that are hot. In cases where localized hot spots are detected, the positioning and/or angle of the one or more servo-controlled vents may be updated in real time or near-real time to target the airflow to the changed spatial location of each localized hot spot. When multiple hot spots are detected, the positioning and/or angle of the one or more servo-controlled vents may focus on one hot spot until it falls below a threshold level. Alternately, the positioning and/or angle of the one or more servo-controlled vents may cycle through multiple of the hot spots, or the angle of the vents may be widened.

In another example, the in-vehicle electronic device 114 may be configured to control the vehicle audio system to direct an audio output from a plurality of audio speakers of the vehicle audio system to a second body portion of the first occupant. In this case, the second body portion may refer to the middle portion of the face rectangle of the detected facial portion of the first occupant (such as the first user 116A). The audio output from the plurality of audio speakers may be directed toward the second body portion based on the estimated second Z-height (e.g., "Y" cm) of the second body portion (e.g., the middle portion of the face rectangle) of the first occupant and the determined associative relationship that the second Z-height is associated with the vehicle audio system. Thus, similar to the first occupant, different Z-heights are estimated for each occupant from the middle portion of the face rectangle to the reference position, and the vehicle audio system may be tuned in real time or near-real time for optimum audio performance and enhanced listening experience for the one or more occupants in the vehicle 102.

In accordance with an embodiment, the in-vehicle electronic device 114 may be configured to monitor, by use of the image-capture device 112, a plurality of defined metrics related to the driver, such as the first user 116A, of the vehicle 102. The plurality of defined metrics related to the driver of the vehicle 102 may include, but are not limited to a facial position, body language, a seating position, eye movement, body movement, health parameters, and a tone, or pitch of driver's voice. The in-vehicle electronic device 114 may detect a state of the driver of the vehicle 102 based on the analysis of the plurality of defined metrics. The in-vehicle electronic device 114 may be configured to utilize a machine learning system to detect if the driver is in normal state or in a distressed state when a sudden deviation in the plurality of defined metrics is detected. For example, based on historical data related to driver (such as the identified first user 116A), a baseline behavior, body language, seating position, eye movement, body movement, health parameters, and the tone, or pitch of driver's voice may be established as regular and tagged as normal. Thus, when a sudden deviation or anomaly in the plurality of defined metrics is detected, the in-vehicle electronic device 114 may generate and communicate a driver emergency alert signal to the vehicle audio system for output. The vehicle audio system may be activated and an audio alert, (e.g., "Are you OK, or shall I alert emergency services?") may be outputted via one of the plurality of speakers of the vehicle audio system. This may occur when the driver is suspected to be in distressed state. Thereafter, the in-vehicle electronic device 114 may be configured to activate an emergency response (ERS) mode in the vehicle 102. The in-vehicle electronic device 114 may be configured to communicate a health emergency alert signal to the medical emergency center 106 if no response is received from the driver within a user specified or pre-defined time period. The health emergency alert signal may be referred to as emergency call systems, or simply eCall. eCall is an emergency response system known in the art. Typically, when vehicle crash sensors are triggered, the eCall system detects that the occupants are in distress and automatically calls emergency services to alert of possible injuries. The eCall system also transmits vehicle location (e.g., GPS coordinates) to the medical emergency center 106 (e.g., an emergency response team).

In accordance with an embodiment, when the ERS mode is activated and no response is received from the driver (e.g., the first user 116A) within the user specified or pre-defined time period, the in-vehicle electronic device 114 may be configured to communicate a self-diagnostic test start signal to an on-board diagnostics (OBD) system of the vehicle 102. The self-diagnostic test is done to determine whether the vehicle 102 is damaged or okay-to-drive in an autonomous mode or auto pilot (AP) mode. In cases where the vehicle 102 is damaged, the vehicle 102 remains parked, a health emergency alert signal is communicated to the medical emergency center 106. In cases where the vehicle 102 is diagnosed as okay-to-drive but the driver is unresponsive to the audio alert, the in-vehicle electronic device 114 may communicate an autonomous mode start signal to an engine control module (ECM) of the vehicle 102. This may cause the vehicle 102 to automatically drive itself to a nearest hospital or an emergency service provider, such as the medical emergency center 106. In certain scenarios, the driver profile may include user preferences related to handling of emergency response. For example, the driver, such as the first user 116A may feed information related to one or more hospitals of choice in an order of preference, a preferred health insurance network, contact numbers of friends and family, and the like, via a user interface rendered on the display (such as the display 210 of FIG. 2). In cases where such user preferences related to handling of emergency response is present, and the emergency response AP-mode is activated, the in-vehicle electronic device 114 may dynamically set a destination location in a navigation unit of the vehicle 102 to one of the preferred hospitals. The selection of the preferred hospital from the listed hospitals may be done based on a shortest distance between each location of the listed hospitals from a current location of the vehicle 102 and the order of preference. Thereafter, the in-vehicle electronic device 114 may communicate the autonomous mode start signal to the ECM of the vehicle 102 to cause the vehicle 102 to automatically drive itself to the set destination location of the selected hospital. The in-vehicle electronic device 114 may also communicate a route information from the current location of the vehicle 102 to the set destination location of the selected hospital, to the contact numbers of friends and family, as provided in the driver profile. The route information may be communicated via the wireless communication network 110, by use of a wireless communication system of the vehicle 102.

Figure 2:
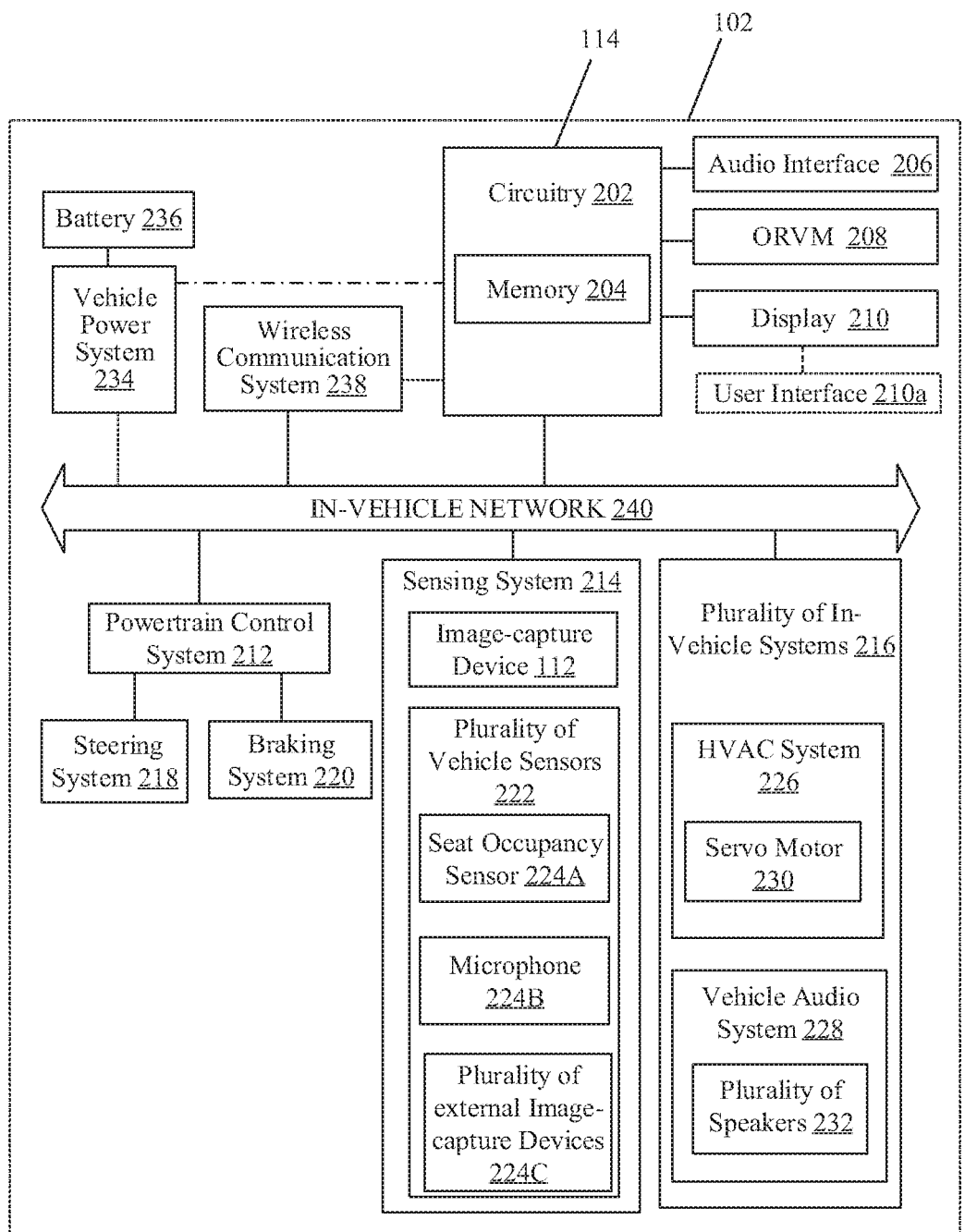
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the vehicle 102. The vehicle 102 may comprise the in-vehicle electronic device 114. The in-vehicle electronic device 114 may be implemented as a part of the IVI system or as an ECU. The in-vehicle electronic device 114 may include circuitry 202, which may comprise at least a microprocessor. The in-vehicle electronic device 114 may also include a memory 204. The vehicle 102 may comprise an audio interface 206, an outside rear view mirror (ORVM) 208, and a display 210 communicatively coupled to the in-vehicle electronic device 114. In some embodiments, the display 210 may be part of the in-vehicle electronic device 114 (e.g., display of an infotainment head unit, where the in-vehicle electronic device 114 is implemented as a part of the IVI system). One or more user interfaces (UIs), such as the UI 210a, may be rendered on the display 210.

The vehicle 102 may further comprise a powertrain control system 212, a sensing system 214, and other systems, such as a plurality of in-vehicle systems 216. The powertrain control system 212 may include a steering system 218 and a braking system 220. The sensing system 214 may include a plurality of vehicle sensors 222, a plurality of external cameras, such as a plurality of external image-capture devices 224C, and an inner camera, such as the image-capture device 112 of FIG. 1. The plurality of in-vehicle systems 216 may include an HVAC system 226 and a vehicle audio system 228. The HVAC system 226 may include one or more servo motors, such as the servo-motor 230. The vehicle audio system 228 may include a plurality of speakers 232. The vehicle 102 may further comprise a vehicle power system 234, a battery 236, a wireless communication system 238, and an in-vehicle network 240.

The various components or systems may be communicatively coupled via the in-vehicle network 240, such as a vehicle area network (VAN), and/or an in-vehicle data bus. The circuitry 202, such as a microprocessor, may be communicatively coupled to the audio interface 206, the ORVM 208, the display 210, the sensing system 214, the plurality of in-vehicle systems 216, and the wireless communication system 238. The circuitry 202 may also be operatively connected with the powertrain control system 212, the steering system 218, and the braking system 220. The wireless communication system 238 may be configured to communicate with one or more external devices, such as the RSU 108 and the server 104 under the control of the circuitry 202. A person of ordinary skill in the art will understand that the vehicle 102 may also include other suitable components or systems, in addition to the components or systems which are illustrated herein to describe and explain the function and operation of the present disclosure.

The circuitry 202 may comprise suitable logic, circuits, interfaces, and/or code that may be configured to execute a set of instructions stored in the memory 204. The circuitry 202 may refer to a microprocessor. In accordance with an embodiment, the circuitry 202 may be configured to automatically control one or more components or systems, such as the powertrain control system 212, the steering system 218, the braking system 220, the sensing system 214, and/or the plurality of in-vehicle systems 216 of the vehicle 102, when the vehicle 102 is in an autonomous mode. Examples of the circuitry 202 may include, but are not limited to a microcontroller, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a set of instructions executable by the circuitry 202. The memory 204 may store various types of information related to the vehicle 102. Various types of information may include Z-height information of a plurality of body portions of each occupant of the vehicle 102, and associative relationship between the Z-height information and corresponding in-vehicle system of the plurality of in-vehicle systems 216. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory.

The audio interface 206 may be connected to the vehicle audio system 228 or other device that may be configured to generate a sound. The audio interface 206 may also be connected to the microphone 224B or other device to receive a voice input from an occupant, such as the first user 116A and the second user 116B, of the vehicle 102. The audio interface 206 may also be communicatively coupled to the circuitry 202. The audio interface 206 may be a part of the IVI system or the infotainment head unit of the vehicle 102. The IVI system, for example, may include a combination of hardware devices and software that provides audio or video entertainment to occupants of a vehicle, such as the vehicle 102. In accordance with an embodiment, display 210 may also be communicatively coupled to the IVI system.

The display 210 may comprise suitable logic, circuitry, interfaces, and/or code that may be configured to render various types of information and/or entertainment content via the UI 210a. The UI 210a may be a customized graphical user interface (GUI) configured to display the various types of information, driver profiles, and/or the entertainment content to occupants of the vehicle 102. The display 210 may be a touch screen configured to receive an input from the one or more occupants of the vehicle 102. Examples of the display 210 may include, but are not limited to a display of the infotainment head unit, a projection-based display, a see-through display, and/or an electro-chromic display.

The powertrain control system 212 may refer to an onboard computer of the vehicle 102 that controls operations of an engine and a transmission system of the vehicle 102. In some embodiments, the powertrain control system 212 may control ignition, fuel injection (in case of hybrid or non-electric vehicle), emission systems, and/or operations of a transmission system (when provided) and the braking system 220.

The sensing system 214 may comprise the image-capture device 112 and the plurality of vehicle sensors 222. The plurality of vehicle sensors 222 may include a seat occupancy sensor 224A, a microphone 224B, and a plurality of external image-capture devices 224C. The sensing system 214 may be communicatively coupled to the circuitry 202 to provide input signals to the circuitry 202. For example, the sensing system 214 may be used to sense or detect the sensor data by use of the plurality of vehicle sensors 222 and the selfie camera, such as the image-capture device 112. Other examples of the plurality of vehicle sensors 222, may include, but are not limited to a yaw rate sensor, a vehicle speed sensor, odometric sensors, a steering angle sensor, a vehicle travel direction detection sensor, a magnetometer, an image sensor, a touch sensor, an infrared (IR) sensor, Lidar, and a depth sensor.

The plurality of in-vehicle systems 216 may include at least the HVAC system 226 and the vehicle audio system 228. One or more vents may be connected to the HVAC system 226 so that hot, cold, and/or dehumidified air may be introduced in the interior of the vehicle 102 as per needs or as desired. The one or more vents may be servo-controlled vents that are controlled by one or more servo motors, such as the servo-motor 230. In some embodiments, a first vent may be coupled to the HVAC system 226 to generate a first plane of air (e.g., a horizontal plane) in the interior of the vehicle 102. A second vent may be coupled to the HVAC system 226 to generate a second plane of air (e.g., a vertical plane). The vehicle audio system 228 may include the plurality of speakers 232.

The steering system 218 may be configured to receive one or more control command from the circuitry 202. The steering system 218 may include a steering wheel and/or an electric motor (provided for a power-assisted steering) that may be used by the first user 116A to control movement of the vehicle 102 in manual mode or a semi-autonomous mode. In accordance with an embodiment, the movement or steering of the vehicle 102 may be automatically controlled when the vehicle 102 is in autonomous mode. Examples of the steering system 218 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 220 may be used to stop or slow down the vehicle 102 by application of resistive forces such as electromagnetic and/or frictional forces. The braking system 220 may be configured to receive a command from the powertrain control system 212 under the control of the circuitry 202, when the vehicle 102 is in an autonomous mode or a semi-autonomous mode. In accordance with an embodiment, the braking system 220 may be configured to receive a command from the circuitry 202 when the circuitry 202 preemptively detects a steep curvature based on the set current travel route of the vehicle 102, an obstacle, or other road hazards.

The vehicle power system 234 may regulate the charging and the power output of the battery 236 to various electric circuits and the loads of the vehicle 102. When the vehicle 102 is a hybrid vehicle or an autonomous vehicle, the vehicle power system 234 may provide the required voltage for certain components and enable the vehicle 102 to utilize the battery 236 power for a sufficient amount of time. In accordance with an embodiment, the vehicle power system 234 may correspond to power electronics, and may include a microcontroller that may be communicatively coupled (shown by dotted lines) to the in-vehicle network 240. In such an embodiment, the microcontroller may receive one or more commands from the powertrain control system 212 under the control of the circuitry 202.

The battery 236 may be a source of electric power for one or more electric circuits or loads (not shown). For example, the loads may include, but are not limited to various lights or lighting systems, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 218. The battery 236 may be a rechargeable battery. The battery 236 may be a source of electrical power to the in-vehicle electronic device 114 (shown by dashed lines), the plurality of vehicle sensors 222, the image-capture device 112, and other hardware units, such as display 210. The battery 236 may be a source of electrical power to start an engine of the vehicle 102.

The wireless communication system 238 may comprise suitable logic, circuitry, interfaces, and/or code that may be configured to communicate with other vehicles (a V2V communication) and one or more external devices (such as the RSU 108), and one or more cloud servers, such as the server 104, via the wireless communication network 110. The wireless communication system 238 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 238 may wirelessly communicate by use of various communication protocols of the short or medium range communication channel and wireless communication network 110 (as described in FIG. 1).

The in-vehicle network 240 may include a medium through which the various control units, components, and/or systems of the vehicle 102 (such as the in-vehicle electronic device 114, the audio interface 206, display 210, the powertrain control system 212, the sensing system 214, the plurality of in-vehicle systems 216, and the wireless communication system 238) may communicate with each other. In accordance with an embodiment, in-vehicle communication of audio/video data for multimedia components may occur by use of Media Oriented Systems Transport (MOST) multimedia network protocol of the in-vehicle network 240 or other suitable networks for audio/video data communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the vehicle 102. The in-vehicle network 240 may facilitate access control and/or communication between the circuitry 202 and other ECUs, such as ECM or a telematics control unit (TCU) of the vehicle 102. Various devices or components in the vehicle 102 may be configured to connect to the in-vehicle network 240, in accordance with various wired and wireless communication protocols. Examples of the wired and wireless communication protocols for the in-vehicle network 240 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (PC), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The functions and/or operations performed by the in-vehicle electronic device 114, as described in FIG. 1A, may be performed by the circuitry 202, such as a microprocessor. Other operations performed by the circuitry 202, are further described, for example, in FIGS. 3A to 3F.

FIGS. 3A to 3F illustrate exemplary scenarios for implementation of the disclosed personalization system and method for a vehicle based on spatial locations of body portions of occupants in the vehicle, in accordance with an embodiment of the disclosure. FIGS. 3A to 3F are explained in conjunction with elements from FIGS. 1 and 2.

Figure 3A:
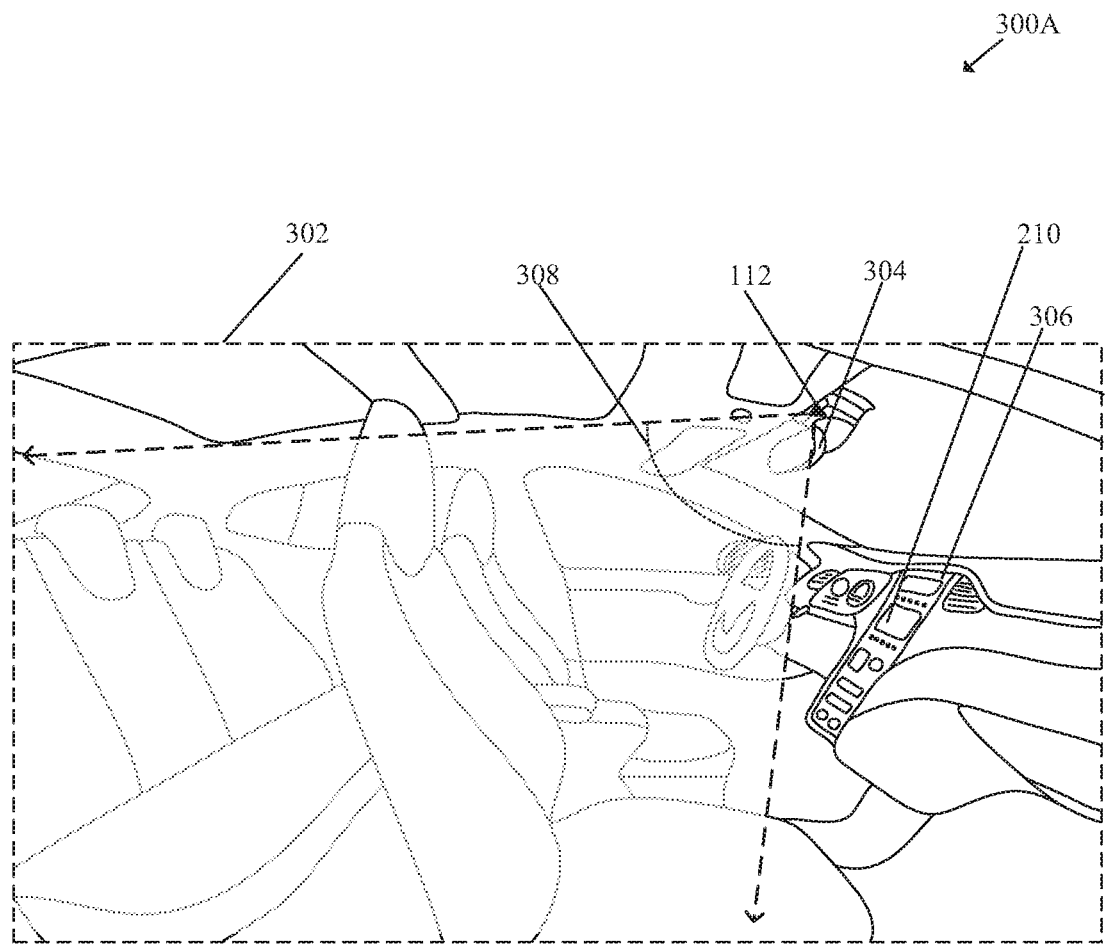
FIGS. 3A to 3F illustrate exemplary scenarios for implementation of the disclosed personalization system and method for a vehicle based on spatial locations of body portions of occupants in the vehicle, in accordance with an embodiment of the disclosure.

With reference to FIG. 3A, there is shown an exemplary scenario 300A. The exemplary scenario 300A illustrates a portion 302 of the interior of the vehicle 102 to depict the location of mounting of the image-capture device 112 in the vicinity of a front mirror 304. There is also shown the display 210 of an infotainment head unit 306. The image-capture device 112 may be a wide-angle camera having a field-of-view 308 that is suited to capture a plurality of images of all the occupants of the vehicle 102 when the occupants are in a seated position.

Figure 3B:
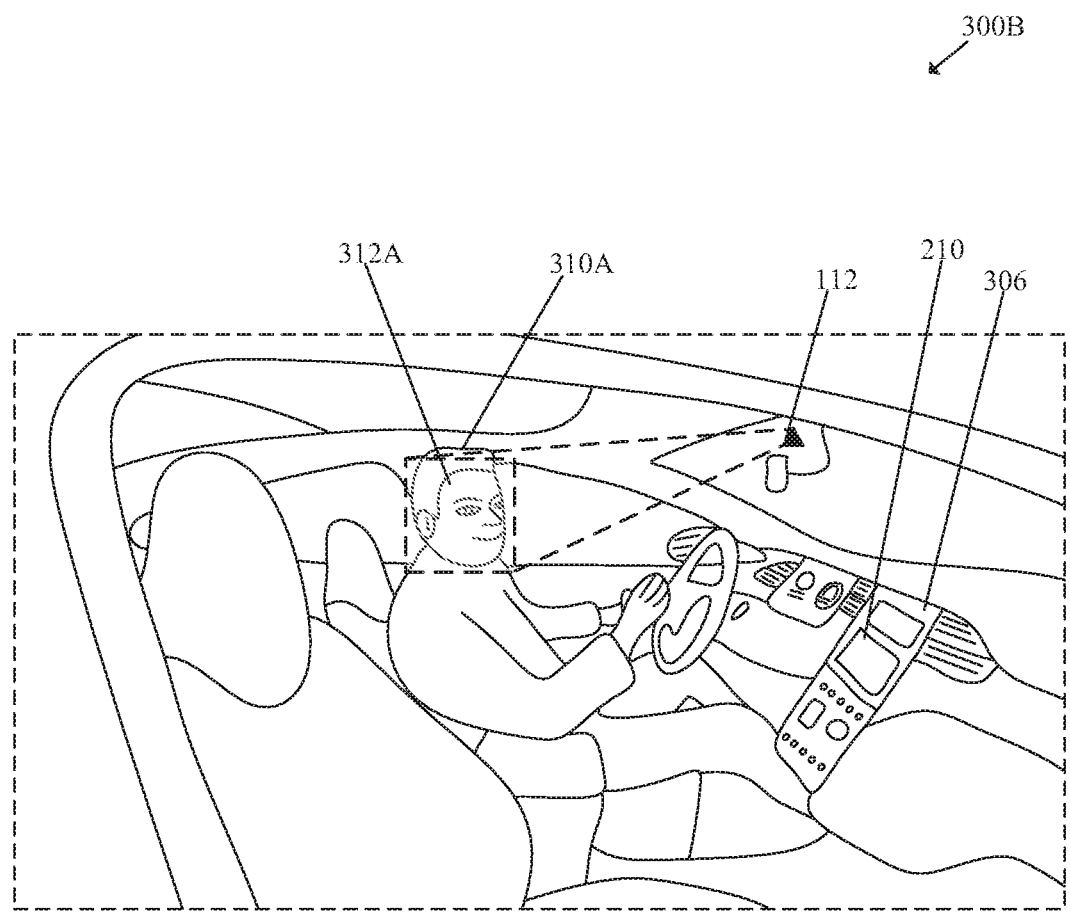

With reference to FIG. 3B, there is shown an exemplary scenario 300B. FIG. 3B is explained in conjunction with elements from FIGS. 1, 2, and 3A. The exemplary scenario 300B includes a portion of the interior of the vehicle 102 to depict identification of a first occupant 310A in the vehicle 102 and tracking of a first facial portion 312A by the image-capture device 112. The first occupant 310A may correspond to the first user 116A (FIG. 1).

The image-capture device 112 may be configured to capture one or more images or a video of the first occupant 310A. The circuitry 202 may be communicatively coupled to the image-capture device 112. The circuitry 202 may be configured to identify a driver profile associated with the first occupant 310A based on facial recognition of the first occupant 310A. The circuitry 202 may be configured to match facial features of the first occupant 310A with stored images or facial features of different users for the identification of the first occupant 310A. In certain scenarios, for example, in low lighting conditions or at night, one or more other sensors, such as IR sensor, may be employed to aid in identification based on a comparison of an object boundary of the first occupant 310A and pre-stored boundary data of different users. In some embodiments, the image-capture device 112 may include night-vision functionalities to execute facial recognition at night or in low lighting conditions.

In cases where the driver profile of the first occupant 310A is identified based on facial recognition, the circuitry 202 may be configured to communicate an audio signal to the vehicle audio system 228 to output a customized audio greeting specific to the first occupant 310A. For example, the first occupant 310A may be notified of recognition confirmation with custom audio greeting, "Good morning, Fredrick; How are you doing today?" via at least one of the audio speakers of the plurality of speakers 232. Based on learned information received from the machine learning system in the memory 204, the circuitry 202 may be configured to predict that first occupant 310A intends to drive to the office address of the first occupant 310A. The learned information is generated by the machine learning system based on analysis of historical data related to a schedule of daily activities, user behavior, and a current time of day. In some embodiments, the circuitry 202 may be configured to automatically set the destination location in the navigation unit of the vehicle 102 and seek confirmation from the first occupant 310A for an autonomous ride. For example, the destination location automatically set to the office address when it is detected that the first occupant 310A usually takes an autonomous ride to office in the morning time between 8 AM and 9 AM, based on the analysis of the historical data.

In some embodiments, the circuitry 202 may be configured to execute a first level of customization in the vehicle 102 based on the defined user preferences in the identified driver profile of the first occupant 310A. For example, the electrically powered adjustable components, such as the driver seat, vehicle mirrors (e.g., the ORVM 208), front mirror, radio, music preferences, and driving mode preferences, may be adjusted in accordance with the user preferences in the driver profile of the first occupant 310A. The circuitry 202 may be configured to communicate a plurality of control signals to one or more other ECUs to initiate the adjustments in accordance with the user preferences in the driver profile of the first occupant 310A.

Figure 3C:
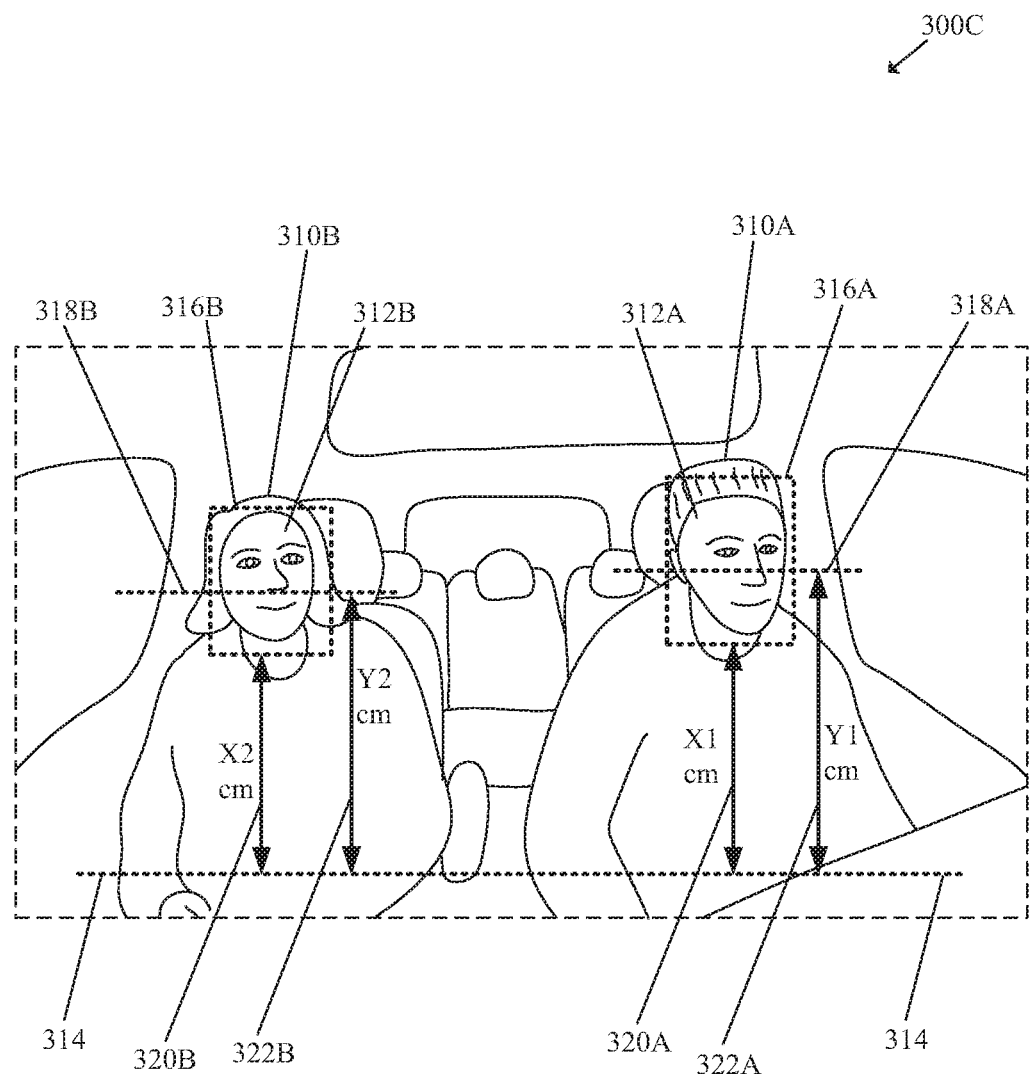

With reference to FIG. 3C, there is shown an exemplary scenario 300C. FIG. 3C is explained in conjunction with elements from FIGS. 1, 2, 3A, and 3B. The exemplary scenario 300B illustrates a portion of the interior of the vehicle 102 to depict determination of a plurality of Z-heights of a plurality of body portions of the first occupant 310A and a second occupant 310B in the vehicle 102.

In FIG. 3C, there is shown a first body portion, such as the first facial portion 312A of the first occupant 310A and a second facial portion 312B of the second occupant 310B. There is further shown a reference position 314, a second body portion, such as a first facial middle portion 318A and a second facial middle portion 318B, and face rectangles 316A and 316B.

In accordance with an embodiment, the circuitry 202 may be configured to estimate a first Z-height 320A (also represented by "X1" cm") of the first facial portion 312A of the first occupant 310A from the reference position 314 in the vehicle, as shown. The circuitry 202 may be configured to continuously track the first facial portion 312A as represented by the face rectangle 316A. The first Z-height 320A of "X1" cm, may refer to a vertical height from the reference position 314 in the vehicle 102 to one side (e.g., the lower side) of the face rectangle 316A of the detected first facial portion 312A of the first occupant 310A. The reference position 314 corresponds a horizontal plane in the vehicle 102 from a seated position of the first occupant 310A, as shown, for example. A second Z-height 322A (also represented by "Y1" cm") of a second body portion, such as the first facial middle portion 318A, from the reference position 314 may also be estimated, as shown. Similar to the first Z-height 320A and the second Z-height 322A for different body portions of the first occupant 310A, the circuitry 202 may be further configured to estimate a third Z-height 320B of the second facial portion 312B of the second occupant 310B from the reference position 314. Accordingly, a fourth Z-height 322B of the second facial middle portion 318B from the reference position 314 may also be estimated.

In accordance with an embodiment, the plurality of Z-heights of the plurality of body portions may be estimated concurrently by face tracking based on the plurality of images captured by the image-capture device 112. It is to be understood by a person of ordinary skill in the art that only two body portions and two occupants are described above for exemplary and illustrative purposes only, and therefore, shall not be construed to limit the scope of the disclosure.

The circuitry 202 may be further configured to determine an associative relationship between the estimated plurality of Z-heights and the plurality of in-vehicle systems 216 of the vehicle 102. An example of the associative relationship between the estimated plurality of Z-heights and the plurality of in-vehicle systems 216 of the vehicle 102, is given in TABLE 1.

TABLE 1

Associative relationship between a Z-height of a body portion and corresponding mapped in-vehicle system

| Occupants | Occupant_name | First_Z-height_B1 | Vehicle_system_1 | Second_Z-height_B2 | vehicle_system_2 | ... |
|---|---|---|---|---|---|---|
| D01 | Fredrick | X1 | HVAC | Y1 | Audio | ... |
| P01 | Samantha | X2 | HVAC | Y2 | Audio | ... |
| ... | ... | ... | ... | ... | ... | ... |

With reference to TABLE 1, the column "Occupants" denotes type of occupants (such as a driver) and an identification number of driver profile "D01". The column "Occupant_name" denotes name of the occupant as identified based on face recognition. In case an occupant is unidentified, the cell may be left blank or "0". The column "First_Z-height_B1" includes the first Z-height 320A (also represented by "X1" cm") of the first facial portion 312A of the first occupant 310A (e.g., having driver profile "D01"). The column "First_Z-height_B1" also includes the third Z-height 320B (also represented by "X2" cm") of the second facial portion 312B of the second occupant 310B (e.g., having a new passenger profile "P01"). The first body portion, such as both the facial portions 312A and 312B, are associated with the HVAC system 226 (an in-vehicle system of the plurality of in-vehicle systems 216 represented under column "Vehicle_system_1") in the TABLE 1, as shown. Similarly, the second Z-height 322A (also represented by "Y1" cm") of a second body portion, such as the first facial middle portion 318A and the fourth Z-height 322B (also represented by "Y2" cm") of the second facial middle portion 318B are associated with the vehicle audio system 228.

Figure 3D:
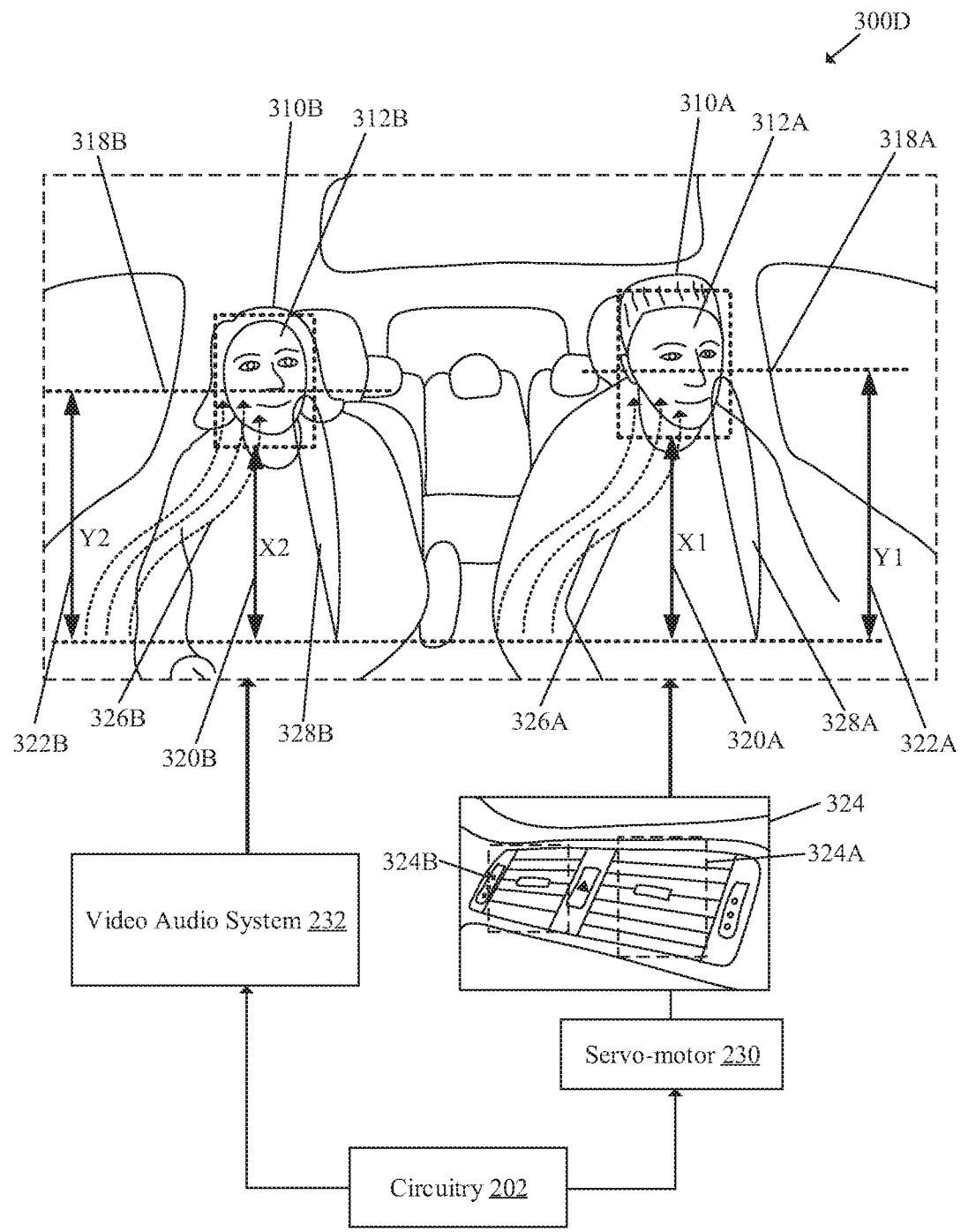

With reference to FIG. 3D, there is shown an exemplary scenario 300D. FIG. 3D is explained in conjunction with elements from FIGS. 1, 2, 3A, 3B, and 3C. The exemplary scenario 300D illustrates a portion of the interior of the vehicle 102 to depict a precise personalization of in-vehicle systems based on Z-heights of body portions of vehicle occupants. There is further shown a HVAC unit 324 with a first set of vents 324A and a second set of vents 324B. There is also shown a custom output from the HVAC unit 324, such as a direction of a first airflow 326A to the first facial portion 312A of the first occupant 310A and a direction of a second airflow 326B to the second facial portion 312B of the second occupant 310B. A custom output from the vehicle audio system 228 to the first facial middle portion 318A and the second facial middle portion 318B, is also shown.

In accordance with an embodiment, the circuitry 202 may be configured to control the plurality of in-vehicle systems 216 to direct an output from a corresponding in-vehicle system of the plurality of in-vehicle systems 216 to a specific body portion of the plurality of body portions of each of the one or more occupants in the vehicle 102. The output from a corresponding in-vehicle system, such as the HVAC system 226, may be directed to the specific body portion, such as the face portions, based on the estimated plurality of Z-heights and the determined associative relationship, as shown in TABLE 1, for example. In some embodiments, the plurality of in-vehicle systems 216 may be controlled concurrently to direct a plurality of output from the plurality of in-vehicle systems 216 such that output from one in-vehicle system, such as the HVAC system 226, do not interfere (and instead complement) with output of another in-vehicle system, such as the vehicle audio system 228, of the plurality of in-vehicle systems 216.

The circuitry 202, such as the microprocessor, may be configured to control an angle of the first set of vents 324A of the HVAC unit 324 to direct an airflow (such as the first airflow 326A) toward the first facial portion 312A of the first occupant 310A. The airflow (such as the first airflow 326A) may be directed toward the first facial portion 312A based on the estimated first Z-height 320A (e.g., "X1" cm) and the determined associative relationship that the first Z-height 320A (e.g., "X1" cm) is meant for the HVAC system 226 of the vehicle 102. The circuitry 202 may be configured to communicate a position control signal to the first set of vents 324A to automatically control positioning and/or angle of first set of vents 324A such that an airflow output from the first set of vents 324A is directed toward the first facial portion 312A. Similarly, the circuitry 202 may be configured to control an angle of the second set of vents 324B of the HVAC unit 324 to direct an airflow (such as the second airflow 326B) toward the second facial portion 312B of the second occupant 310B in accordance with the estimated third Z-height 320B (also represented by "X2" cm"). The positioning and/or angle of the servo-motor 230 controlled first set of vents 324A and the second set of vents 324B are vertically adjusted and updated continuously to control airflow in real time or near-real time based on face tracking and change in estimation of corresponding Z-heights of the facial portions 312A and 312B.

The control the plurality of in-vehicle systems 216 further includes control of the vehicle audio system 228 to direct an audio output from the plurality of speakers 232 of the vehicle audio system 228 toward the mid facial portions 318A and 318B of first occupant 310A and the second occupant 310B respectively. The directivity of the audio output may be based on the second Z-height 322A (also represented by "Y1" cm") and the fourth Z-height 322B (also represented by "Y2" cm") and the determined associative relationship that the "Y1" and "Y2" are associated with the vehicle audio system 228 for optimum audio experience. Thus, the vehicle audio system 228 may be tuned in real time or near-real time for optimum audio performance and enhanced listening experience for the first occupant 310A and the second occupant 310B in the vehicle 102.

Figure 3E:
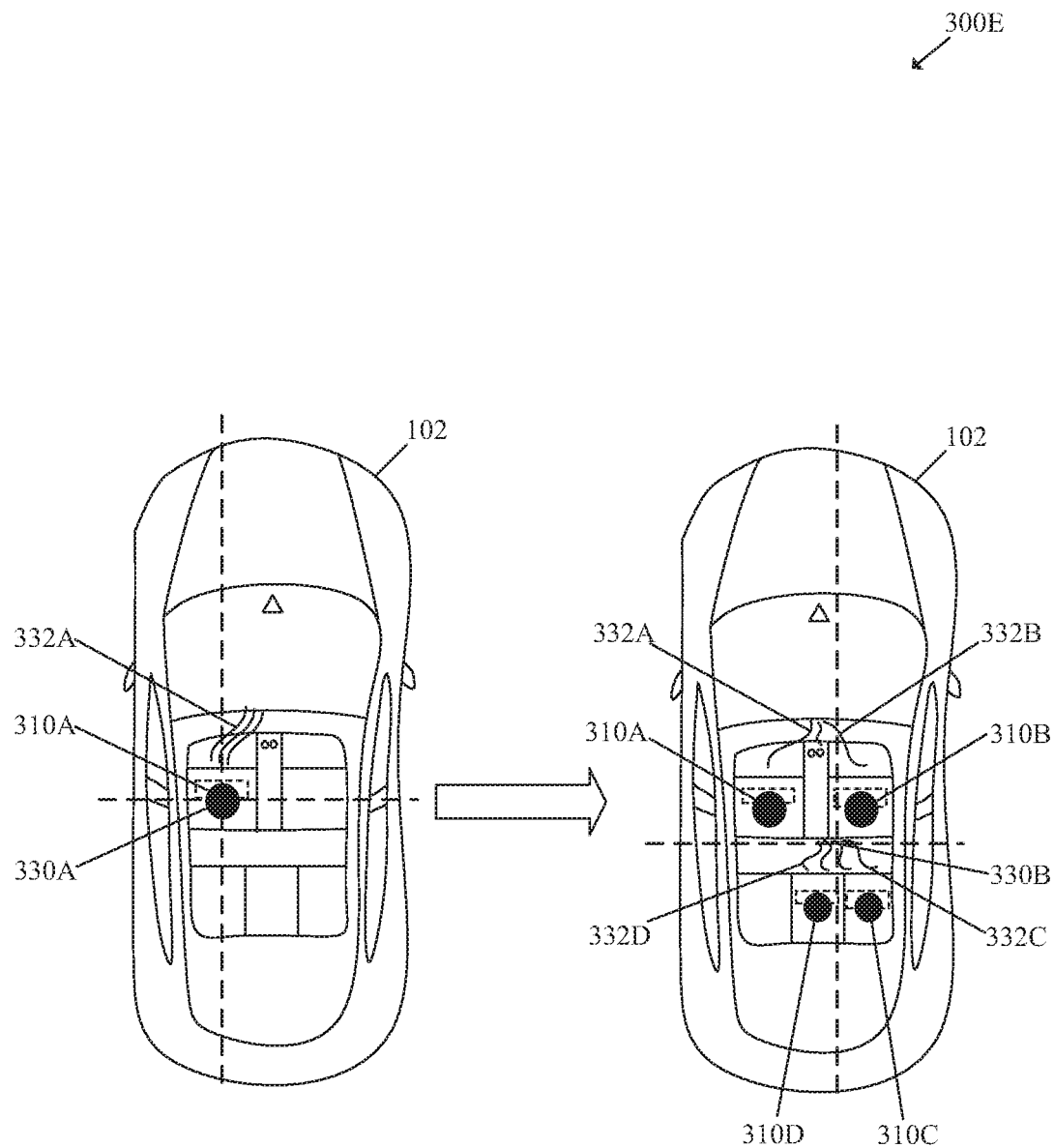

With reference to FIG. 3E, there is shown an exemplary scenario 300E. FIG. 3E is explained in conjunction with elements from FIGS. 1, 2, and 3A to 3D. The exemplary scenario 300E illustrates a top view of the interior of the vehicle 102 to depict a precise and a real time personalization of in-vehicle systems based on Z-heights of body portions of vehicle occupants, occupants positioning, and the number of occupants. There is further shown a first center of audio focus 330A, a second center of audio focus 330B and different directions of airflows 332A, 332B, 332C, and 332D based on positioning and the detected number of occupants, such as the first occupant 310A, the second occupant 310B, a third occupant 310C, and a fourth occupant 310D.

In accordance with an embodiment, in addition to the vertical Z-height based personalization, a horizontal (X, Y coordinates) occupant's position based personalization may also occur in the vehicle 102. For example, the circuitry 202 may be configured to determine and update an optimal location in real time or near-real time for a center of audio focus in the interior of the vehicle 102 based on a track of current positioning of one or more occupants in the vehicle 102. For example, when a single occupant, such as the first occupant 310A is present in the vehicle 102, the circuitry 202 may communicate a first control signal to the vehicle audio system 228 to focus the output from the plurality of speakers 232 to the first center of audio focus 330A. The circuitry 202 may also communicate a second control signal to the HVAC system 226 to selectively direct the airflow 332A from a front HVAC unit of the HVAC system 226 to the first facial portion 312A of the first occupant 310A. In some embodiments, both the first control signal and the second control signal may be communicated concurrently to respective in-vehicle systems.

In accordance with an embodiment, when the number of occupants or seating position of the occupants changes (an increase in this case) in the vehicle 102, the circuitry 202 may be configured to shift the first center of audio focus 330A to the second center of audio focus 330B, as shown in FIG. 3E. In some embodiments, a combination of seat occupancy sensors (such as the seat occupancy sensor 224A) and the face tracking feature of the image-capture device 112 may be utilized for an accurate occupant(s) position estimation.

Further, the output from different servo-controlled vents in the front or rear of the vehicle 102 may be controlled such that each of the first occupant 310A, the second occupant 310B, the third occupant 310C, and the fourth occupant 310D receive a personalized directed airflow (e.g., the different directions of airflows 332A, 332B, 332C, and 332D, as shown). The personalized directed airflow towards their facial portions may be outputted in accordance to estimated Z-heights of the facial portions, as discussed in FIGS. 3C and 3D, for example.

In accordance with an embodiment, Right-left (R-L) balance, Front-back (F-B) fade, and other audio settings may be adjusted for optimal listening experience for current positioning of the one or more occupants. Further, when the vehicle 102 stops and one passenger exits the vehicle 102, the image-capture device 112 may be configured to detect change in an occupant seating scenario. The circuitry 202, based on the detected change in the occupant seating scenario, may automatically update audio settings of the vehicle audio system 228 for the remaining occupants (i.e. new occupant seating scenario).

Figure 3F:
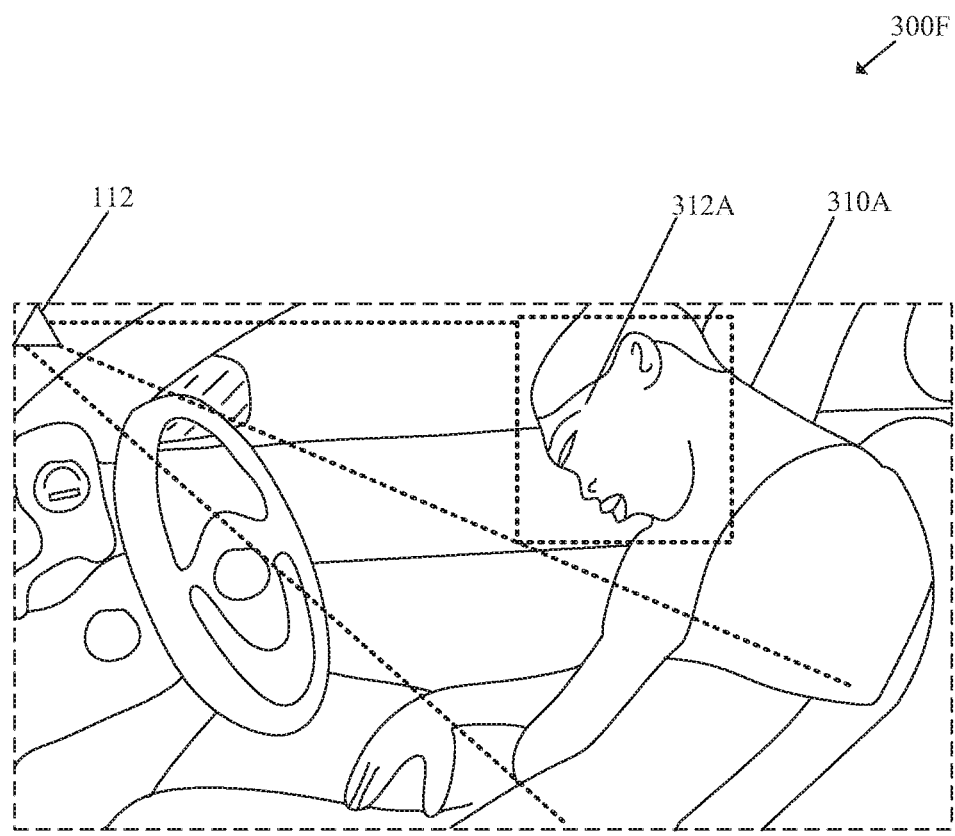
Figure 4A:
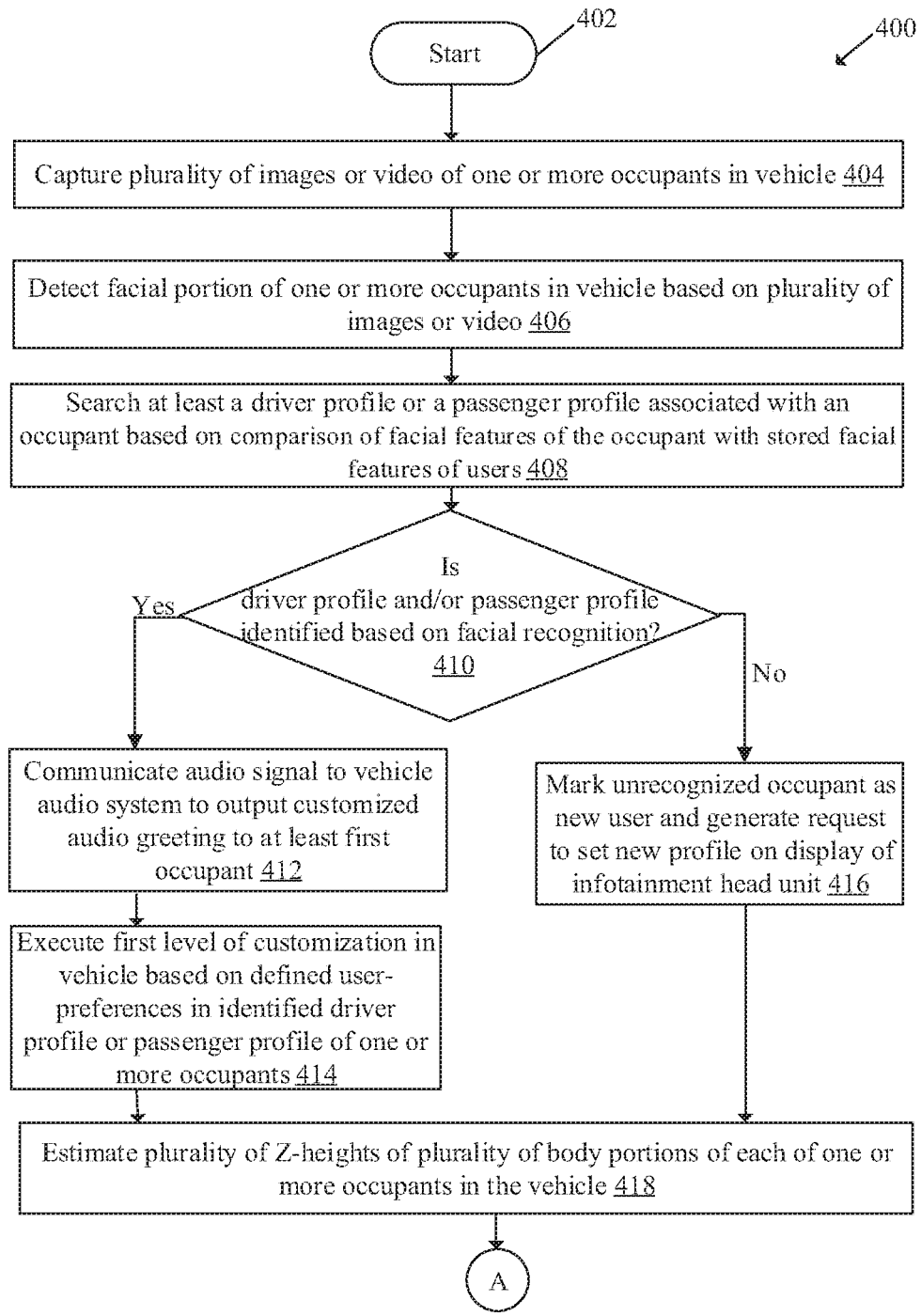
FIGS. 4A, 4B, 4C, and 4D collectively, depict a flow chart that illustrates exemplary operations for personalization of a vehicle based on spatial locations of body portions of occupants in the vehicle, in accordance with an embodiment of the disclosure.
Figure 4B:
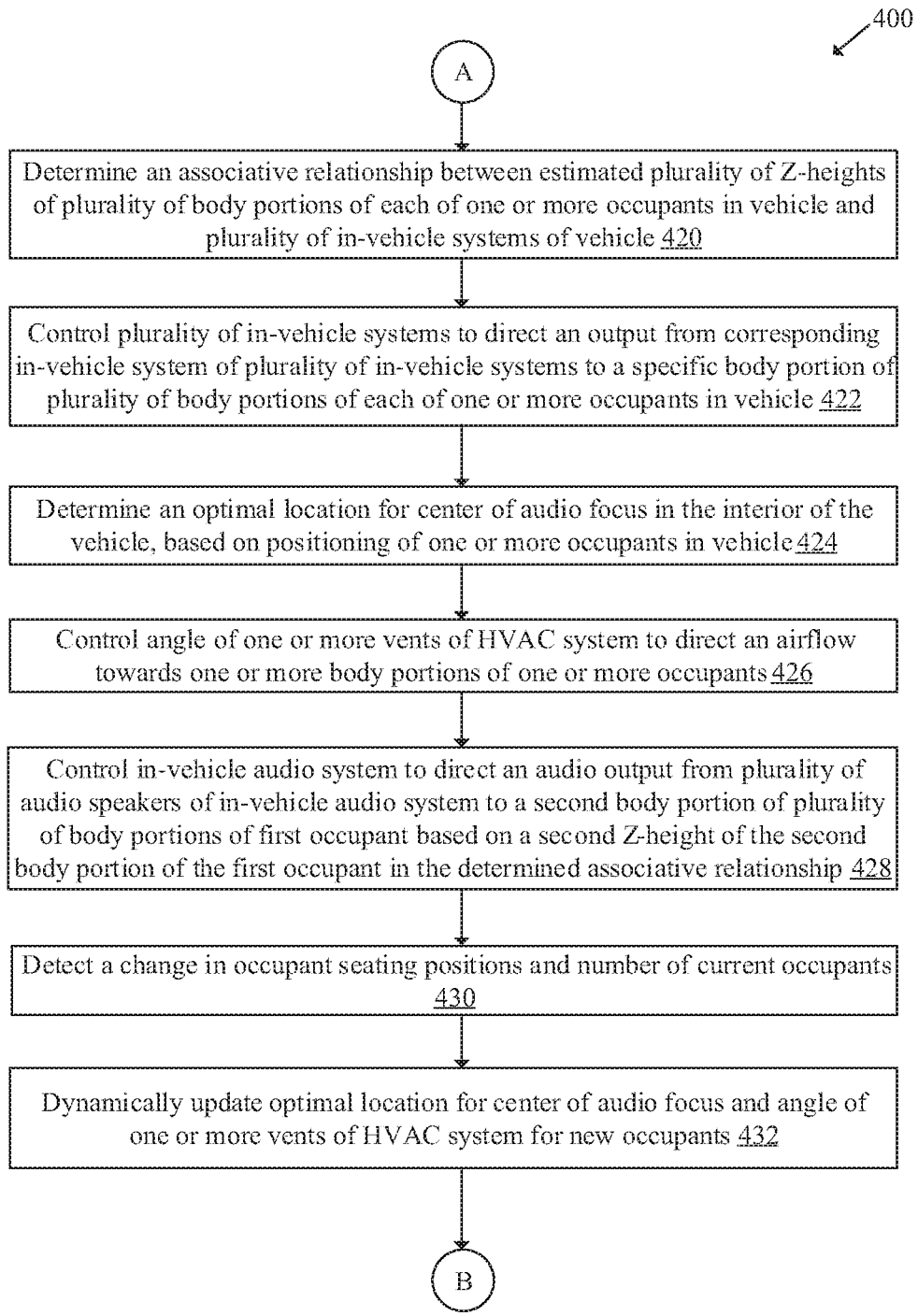
Figure 4C:
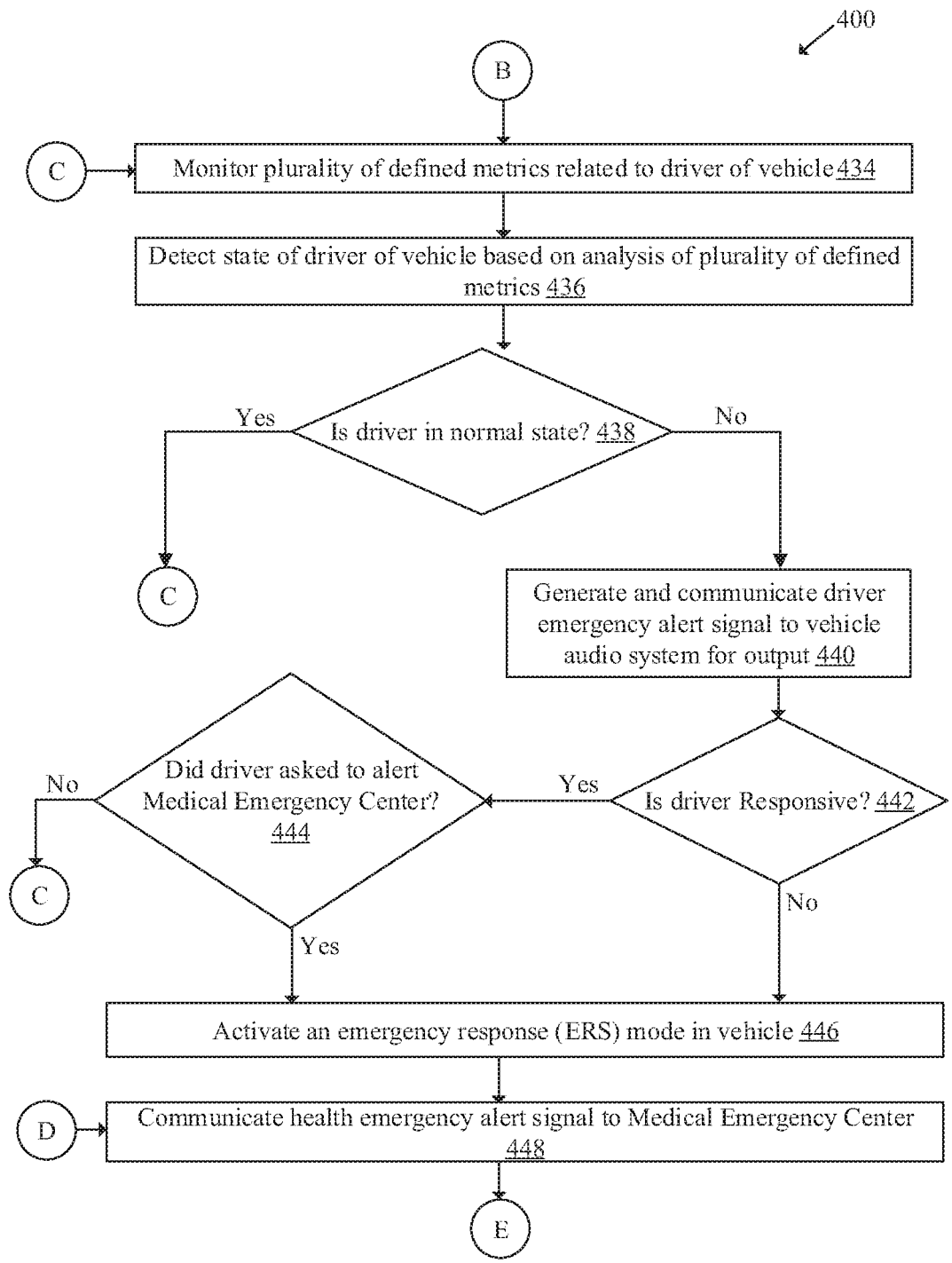
Figure 4D:
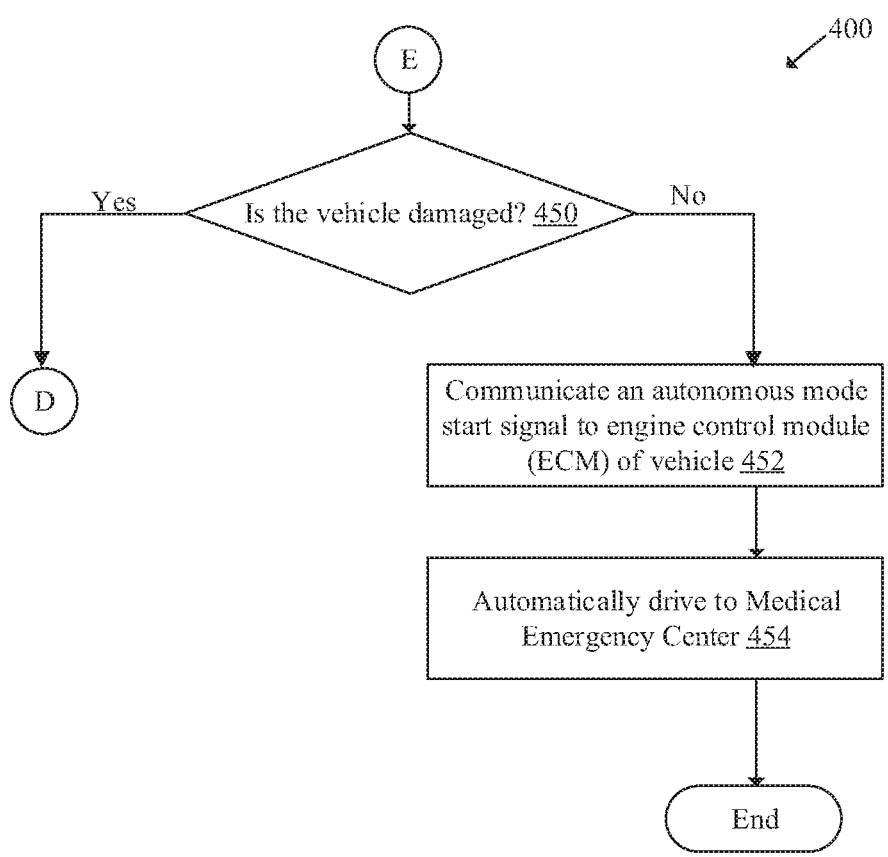

With reference to FIG. 3F, there is shown an exemplary scenario 300F. FIG. 3F is explained in conjunction with elements from FIGS. 1, 2, and 3A to 3E. The exemplary scenario 300F illustrates a portion of the interior of the vehicle 102 to depict monitoring of a driver state. There is shown the first occupant 310A in a distressed state in the vehicle 102.

In accordance with an embodiment, the circuitry 202 may be configured to monitor, by use of the image-capture device 112, a plurality of defined metrics related to the driver, such as the first occupant 310A, of the vehicle 102. The plurality of defined metrics related to the driver of the vehicle 102 may include, but are not limited to a facial position, body language, a seating position, eye movement, body movement, health parameters, and a tone, or pitch of driver's voice. In accordance to the exemplary scenario 300F, the driver, such as the first occupant 310A, is detected in a distressed state during after a crash. The circuitry 202 activates an emergency response (ERS) mode in the vehicle 102 and seeks response from the driver (e.g., the first occupant 310A) within the user specified or pre-defined time period. In other embodiments, a driver dozing off is identified through recognition of closing eyes or a bobbing head. In such a situation, an alert may be sounded, cabin temperature may be reduced, cold air may be blown on the driver, and the vehicle 102 may be brought to a stop in a safe manner, or another action may be taken.

Thereafter, the circuitry 202 may be configured to communicate a self-diagnostic test start signal to an on-board diagnostics (OBD) system of the vehicle 102. The self-diagnostic test is done to determine whether the vehicle 102 is damaged or okay-to-drive in an autonomous mode or auto pilot (AP) mode. In cases where the vehicle 102 is damaged, the vehicle 102 remains parked, and a health emergency alert signal is communicated to the medical emergency center 106, by the wireless communication system 238. In cases where the vehicle 102 is diagnosed as okay-to-drive but the first occupant 310A is unresponsive, the circuitry 202 may communicate an autonomous mode start signal to an engine control module (ECM) of the vehicle 102. This may cause the vehicle 102 to automatically drive itself to a preferred hospital based on the identified driver profile "D01".

FIGS. 4A, 4B, 4C, and 4D collectively, depict a flow chart that illustrates exemplary operations for personalization of a vehicle based on spatial locations of body portions of occupants in the vehicle, in accordance with an embodiment of the disclosure. With reference to FIGS. 4A, 4B, 4C, and 4D there is shown a flow chart 400. The flow chart 400 is described in conjunction with FIGS. 1, 2, and 3A to 3F. The operations, implemented at the in-vehicle electronic device 114 in association with the image-capture device 112, for personalization of a vehicle, begin at 402 and proceed to 404.

At 404, a plurality of images or a video of one or more occupants in the vehicle 102 may be captured. The image-capture device 112 may be configured to capture the plurality of images or the video of the one or more occupants in the vehicle 102. At 406, facial portion(s) of one or more occupants in the vehicle 102 may be detected based on the plurality of images or the video captured by the image-capture device 112.

At 408, at least a driver profile or a passenger profile (each could also be referred to as an occupant profile) associated with each occupant (who may be seated at a driver seat or one of the passenger seats) may be searched based on a comparison of facial features of the occupant with stored facial features of users related to a plurality of driver profiles and a plurality of passenger profiles. The circuitry 202, such as a microprocessor, may be configured to search for the driver profile and/or the passenger profile of each occupant based on the comparison of the facial features of the occupant, such as the first occupant 310A, with stored facial features of users related to the plurality of driver profiles stored in the memory 204. At 410, facial recognition is performed on the acquired data, such as the plurality of images or the video of the one or more occupants, to identify a driver profile and/or a passenger profile. The circuitry 202 may be configured to check whether the driver profile is identified based on facial recognition from the stored plurality of driver profiles in the memory 204. Similarly, the circuitry 202 may be further configured to check whether the passenger profile is identified based on facial recognition from the stored plurality of passenger profiles in the memory 204. A match of the facial features of an occupant, such as the first occupant 310A, with stored facial features of one user may result in the facial recognition. In cases where the driver profile and/or the passenger profile is identified, the control passes to 412 else to 416.

At 412, an audio signal may be communicated to the vehicle audio system 228 to output customized audio greeting to at least the first occupant 310A. The circuitry 202 may be configured to communicate the audio signal to the vehicle audio system 228 to output the customized audio greeting, for example, "Hello, Fredrick" to the first occupant 310A. At 414, a first level of customization may be executed in the vehicle 102 based on defined user-preferences in the identified driver profile or passenger profile of the one or more occupants, such as the first occupant 310A. For example, the electrically powered adjustable components, such as the driver seat, vehicle mirrors (e.g., the ORVM 208), front mirror, radio, music preferences, and driving mode preferences, may be adjusted in accordance with the user preferences in the driver profile of the first user 116A. The circuitry 202 may be configured to communicate a plurality of control signals to one or more other ECUs to initiate the adjustments in accordance with the user preferences in the driver profile of the first occupant 310A. In some embodiments, if there are more than one occupants in the vehicle 102, similar to the first occupant 310A, audio signal may be communicated to the vehicle audio system 228 to output customized audio greeting to each occupant. For example, in addition to custom audio greeting to the first occupant 310A, the second occupant 310B may also be greeted as, "Hello Samantha, how are you doing today?", via an audio speaker that is in vicinity of the second occupant 310B.

At 416, an unrecognized occupant (e.g., a first occupant, a second occupant, or a new occupant) may be marked (or tagged) as a new user and a request to set a new profile may be generated on the display 210 of an infotainment head unit (e.g., the in-vehicle electronic device 114). In cases where there are multiple occupants, and one or more occupants are not identified, for example, a passenger seated at the front seat, the passenger may be tagged as new user and requested to set the new profile similar to the first occupant 310A, such as the driver. At 418, a plurality of Z-heights of a plurality of body portions of each of the one or more occupants in the vehicle 102 may be estimated. An example of the estimation of the plurality of Z-heights, has been shown and described in details in the FIG. 3C.

At 420, an associative relationship may be determined between the estimated plurality of Z-heights of the plurality of body portions of each of the one or more occupants and the plurality of in-vehicle systems 216 of the vehicle 102. An example of the associative relationship is depicted in TABLE 1 in the FIG. 3C. At 422, the plurality of in-vehicle systems 216 may be controlled to direct an output from a corresponding in-vehicle system of the plurality of in-vehicle systems 216 to a specific body portion of the plurality of body portions of each of the one or more occupants in the vehicle 102. An example of the control of the plurality of in-vehicle systems 216, such as the HVAC system 226 and the vehicle audio system 228, has been shown and described in the FIGS. 3D and 3E.

At 424, an optimal location to direct the audio in the interior of the vehicle 102 is determined, based on positioning of the one or more occupants in the vehicle 102. An example of the determination of the optimal location for the center of audio (or music) focus has been shown and described in FIG. 3E. In some embodiments, as the vehicle 102 includes the plurality of speakers 232, audio from all of the plurality of speakers 232 may be directed towards one location (or position). Alternatively, a same audio or different audio from the plurality of speakers 232 may be directed toward different locations in the interior of the vehicle 102 based on positioning of the one or more occupants in the vehicle 102. In cases where audio output from the plurality of speakers 232 are directed toward different locations, each speaker or a group of speakers of the plurality of speakers 232 may output different audio to different locations suited to individual occupant in the vehicle 102. Audio beam forming techniques may be used for providing directed audio toward each occupant. For example, certain speakers of the plurality of speakers 232 may be in close proximity to an occupant. For instance, the vehicle door near driver may comprise multiple speakers to allow for beam forming. In some scenarios, the selection of different audio may be based on individual user-preferences in accordance with identified driver and passenger profiles of each occupant.

At 426, an angle of the one or more vents of the HVAC system 226 may be controlled to direct an airflow toward a first body portion, such as the first facial portion 312A, of the first occupant 310A of the one or more occupants. The airflow may be directed toward the first body portion based on a first Z-height (e.g., the first Z-height 320A) of the first body portion of the first occupant 310A in the determined associative relationship. An example of control of angle to direct an airflow toward a specific body portion, has been shown and described in FIGS. 3D and 3E.

At 428, the vehicle audio system 228 may be controlled to direct an audio output from the plurality of speakers 232 of the vehicle audio system 228 to a second body portion of plurality of body portions of the first occupant 310A. The audio output, for example, an audio beam, may be directed based on a second Z-height (e.g., the second Z-height 322A) of the second body portion of the first occupant 310A in the determined associative relationship. An example of the control of vehicle audio system 228 angle to direct an audio output toward a specific body portion, has been shown and described in the FIG. 3D. At 430, a change in occupant(s) seating positions and a number of current occupants in the vehicle 102 may be detected. The circuitry 202 may be configured to detect the change in occupant(s) seating positions and the number of current occupants in the vehicle 102 based on face tracking of the one or more occupants. In some embodiments, a combination of seat occupancy sensors (such as the seat occupancy sensor 224A) and the face tracking feature of the image-capture device 112 may be utilized for an accurate occupant(s) position estimation. In some embodiments, where there are multiple occupants, for example, the driver, a front passenger and a back passenger seated in a rear seat, the front passenger might have similar setting for air flow, audio, and the like, as that of the driver. However, the back passenger seated in the rear seat, may be a child (or a user of different age-group) and may be associated with different settings (e.g. a preference of reduced audio level as compared to front occupants, a different choice for audio, airflow settings, and the like).

Accordingly, different audio may be played for the back passenger based on identified passenger profile for the rear seat passenger, or a specific audio may be directed to ears of the passenger (e.g., the child) based on the estimated Z-height. In some embodiments, settings for air flow, audio, and the like, may be specific for each occupant, such as the driver and each passenger, based on estimated Z-heights and user-preferences in their respective profiles (e.g., the identified passenger and driver profiles).

At 432, an optimal location for a center of audio focus and an angle of the one or more vents of the HVAC system may be dynamically updated. The update may be done for a specific body portion for new occupants. An example of the shift in the center of audio focus based on an increase in the number of occupants and a concurrent update in the angle of the one or more vents, has been described in FIG. 3E. At 434, a plurality of defined metrics related to a driver, such as the first occupant 310A, of vehicle 102, may be monitored. An example of the monitoring of the plurality of defined metrics has been described in FIGS. 1 and 3F.

At 436, a state of the driver of the vehicle 102 may be detected, based on an analysis of the plurality of defined metrics. An example of a distressed state is shown and described in FIG. 3F. At 438, it may be checked whether the driver is in normal state. In cases where the driver is detected in the normal state, the control returns to 434, as shown. In cases where the driver is detected in the distressed state, the control passes to 440.

At 440, a driver emergency alert signal may be generated and then communicated to the vehicle audio system 228 for output, such as an audio alert. The circuitry 202 may be configured to generate and then communicate the driver emergency alert signal to the vehicle audio system 228 for output via one of the plurality of speakers 232. At 442, it may be checked whether the driver is responsive to the generated output, such as the generated audio alert. In cases where the driver is responsive, the control may pass to 444. In cases where the driver is unresponsive to the audio alert, the control may pass to 446.

At 444, it may be determined whether the driver have requested for emergency services, such as to call the medical emergency center 106. In cases where the driver has requested for emergency services, the control may pass to 446, else the control may return to 434. At 446, an emergency response (ERS) mode may be activated in the vehicle 102. The circuitry 202 may be configured to activate the ERS mode in the vehicle 102.

At 448, a health emergency alert signal may be communicated to the medical emergency center 106. The circuitry 202 may be configured to communicate the health emergency alert signal to the medical emergency center 106 if no response is received from the driver (e.g., the first occupant 310A) within a user specified or pre-defined time period. The health emergency alert signal may be referred to as emergency call systems, or simply eCall. At 450, it may be checked whether the vehicle 102 is damaged based on a self-diagnostic test of the vehicle 102. In cases where the vehicle is damaged, the control may pass to 448 to call for emergency services. In cases where the vehicle is not damaged and diagnosed as okay-to-drive, the control may pass to 452.

At 452, an autonomous mode start signal may be communicated to the engine control module of the vehicle 102. In cases where the vehicle 102 is diagnosed as okay-to-drive but the driver is unresponsive to the audio alert, the circuitry 202 may communicate the autonomous mode start signal to the ECM. At 454, the vehicle 102 may be automatically driven to the medical emergency center 106. The control may pass to the end. The receipt of the autonomous mode start signal at the ECM may cause the vehicle 102 to automatically drive itself to a nearest hospital, such as the medical emergency center 106 or a preferred hospital, if provided in the identified driver profile.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A personalization system for a vehicle, comprising:
   an image-capture device configured to capture a plurality of images of a plurality of occupants in the vehicle, the occupants being positioned at a front and a rear of the vehicle, wherein a first occupant is positioned at the front and a second occupant is positioned at the rear, and wherein the occupants are associated with respective profiles; and
   circuitry configured to:
      estimate a plurality of Z-heights of a plurality of body portions of each of the occupants from a reference position in the vehicle, based on the plurality of images captured from the image-capture device;
      determine an associative relationship between the plurality of Z-heights of the plurality of body portions of each of the occupants in the vehicle and a plurality of in-vehicle systems, wherein a first of the in-vehicle systems is automatically associated with a first body portion of each of the occupants, wherein the circuitry is configured to identify respective Z-heights of the first body portions for the occupants, wherein a second of the in-vehicle systems is automatically associated with a second body portion of each of the occupants, and wherein the circuitry is configured to identify respective Z-heights of the second body portions of the occupants; and
      for each occupant of the plurality of occupants:
         access the profile associated with the occupant, the profile defining user-preferences for the occupant comprising settings for the plurality of in-vehicle systems, and
         control the plurality of in-vehicle systems to direct respective output in accordance with the settings to specific body portions of the occupant in the vehicle, based on the estimated plurality of Z-heights and the determined associative relationship,
      wherein at least a portion of the settings for the first occupant is different than for the second occupant, and wherein the in-vehicle systems are controlled in real-time based on adjustment of the body portions and images captured via the image-capture device.

2. The personalization system according to claim 1, wherein the control of the plurality of in-vehicle systems includes control of an angle of one or more vents of an Heating, Ventilation, and Air Conditioning (HVAC) system to direct an airflow towards a particular body portion of the plurality of body portions of the first occupant, based on a first Z-height of the particular body portion of the first occupant in the determined associative relationship, wherein the HVAC system corresponds to one of the plurality of in-vehicle systems.

3. The personalization system according to claim 1, wherein the control of the plurality of in-vehicle systems includes control of a vehicle audio system to direct an audio output from a plurality of audio speakers of the vehicle audio system to a particular body portion of the plurality of body portions of the first occupant, based on a second Z-height of the particular body portion of the first occupant in the determined associative relationship, wherein the vehicle audio system corresponds to one of the plurality of in-vehicle systems,
   wherein the vehicle audio system is controlled to output reduced audio for the second occupant as compared to the first occupant or is controlled to output different audio for the second occupant as compared to the first occupant.

4. The personalization system according to claim 1, wherein the circuitry is further configured to detect that a driver that corresponds to one of the occupants in the vehicle is in a distressed state or a normal state, based on an analysis of a plurality of defined metrics associated with the driver.

5. The personalization system according to claim 4, wherein the circuitry is further configured to activate an emergency response mode in the vehicle when the driver is detected in the distressed state and is unresponsive to an audio alert generated in the vehicle.

6. The personalization system according to claim 5, wherein the circuitry is further configured to communicate an autonomous mode start signal to an engine control module of the vehicle to cause the vehicle to be automatically driven to a user-specified medical emergency center when the vehicle is diagnosed as okay-to-drive in the emergency response mode.

7. The personalization system according to claim 1, wherein the vehicle is an autonomous, or a semi-autonomous vehicle.

8. A method for handling personalization of a vehicle, the method comprising:
   capturing, by an image-capture device in the vehicle, a plurality of images of a plurality of occupants in the vehicle, the occupants being positioned at a front and a rear of the vehicle, wherein a first occupant is positioned at the front and a second occupant is positioned at the rear, and wherein the occupants are associated with respective profiles;
   estimating, by circuitry in the vehicle, a plurality of Z-heights of a plurality of body portions of each of the occupants from a reference position in the vehicle, based on the plurality of images captured from the image-capture device;
   determining, by the circuitry, an associative relationship between the plurality of Z-heights of the plurality of body portions of each of the occupants in the vehicle and a plurality of in-vehicle systems, wherein a first of the in-vehicle systems is automatically associated with a first body portion of each of the occupants, wherein the circuitry identifies respective Z-heights of the first body portions for the occupants, wherein a second of the in-vehicle systems is automatically associated with a second body portion of each of the occupants, and wherein the circuitry is configured to identify respective Z-heights of the second body portions of the occupants; and
   for each occupant of the plurality of occupants:
      accessing the profile associated with the occupant, the profile defining user-preferences for the occupant comprising settings for the plurality of in-vehicle systems, and
      controlling, by the circuitry, the plurality of in-vehicle systems to direct respective output in accordance with the settings to specific body portions of the occupant in the vehicle, based on the estimated plurality of Z-heights and the determined associative relationship,
wherein at least a portion of the settings for the first occupant is different than for the second occupant, and wherein the in-vehicle systems are controlled in real-time based on adjustment of the body portions and images captured via the image-capture device.

9. The method of claim 8, wherein the controlling of the plurality of in-vehicle systems includes controlling of an angle of one or more vents of an Heating, Ventilation, and Air Conditioning (HVAC) system to direct an airflow towards a particular body portion of the plurality of body portions of the first occupant of the occupants, based on a first Z-height of the particular body portion of the first occupant in the determined associative relationship, wherein the HVAC system corresponds to one of the plurality of in-vehicle systems.

10. The method of claim 8, wherein the controlling of the plurality of in-vehicle systems includes controlling of a vehicle audio system to direct an audio output from a plurality of audio speakers of the vehicle audio system to a particular body portion of the plurality of body portions of the first occupant of the occupants, based on a second Z-height of the particular body portion of the first occupant in the determined associative relationship, wherein the vehicle audio system corresponds to one of the plurality of in-vehicle systems,
wherein the vehicle audio system is controlled to output reduced audio for the second occupant as compared to the first occupant or is controlled to output different audio for the second occupant as compared to the first occupant.

11. The method of claim 8, further comprising the step of detecting that a driver that corresponds to one of the occupants in the vehicle is in a distressed state or a normal state, based on an analysis of a plurality of defined metrics associated with the driver.

12. The method of claim 11, further comprising the step of activating an emergency response mode in the vehicle when the driver is detected in the distressed state and is unresponsive to an audio alert generated in the vehicle.

13. The method of claim 12, further comprising the step of communicating an autonomous mode start signal to an engine control module of the vehicle to cause the vehicle to be automatically driven to a user-specified medical emergency center when the vehicle is diagnosed as okay-to-drive in the emergency response mode.

14. A vehicle comprising:
a battery;
an image-capture device, powered by the battery, configured to capture a plurality of images of a plurality of occupants in the vehicle, the occupants being positioned at a front and a rear of the vehicle, wherein the occupants include at least a first occupant positioned at the front and a second occupant positioned at the rear; and
an in-vehicle electronic device, powered by the battery, configured to:
estimate a plurality of Z-heights of a plurality of body portions of each of the plurality of occupants from a reference position in the vehicle, based on the plurality of images captured from the image-capture device;
determine an associative relationship between the plurality of Z-heights of the plurality of body portions of each of the plurality of occupants in the vehicle and a plurality of in-vehicle systems;
determine an associative relationship between the plurality of Z-heights of the plurality of body portions of each of the occupants in the vehicle and a plurality of in-vehicle systems, wherein a first of the in-vehicle systems is automatically associated with a first body portion of each of the occupants, wherein respective Z-heights of the first body portions are identified for the occupants, wherein a second of the in-vehicle systems is automatically associated with a second body portion of each of the occupants, and wherein respective Z-heights of the second body portions are identified for the occupants; and
control the plurality of in-vehicle systems to direct respective output from a corresponding in-vehicle system of the plurality of in-vehicle systems based on the estimated plurality of Z-heights and the determined associative relationship, wherein the in-vehicle systems are controlled in real-time based on adjustment of the body portions and images captured via the image capture device,
wherein the in-vehicle electronic device controls a vehicle audio system to direct audio output from a plurality of audio speakers of the vehicle audio system, and wherein different audio is output to the second occupant as compared to the first occupant.

15. The vehicle of claim 14, wherein the in-vehicle electronic device controls an angle of one or more vents of an Heating, Ventilation, and Air Conditioning (HVAC) system to direct an airflow towards a particular body portion of the plurality of body portions of the first occupant of the occupants, based on a second Z-height of the particular body portion of the first occupant in the determined associative relationship, wherein the HVAC system corresponds to one of the plurality of in-vehicle systems.

16. The vehicle of claim 14, wherein the vehicle is an autonomous, or a semi-autonomous vehicle.

17. The vehicle of claim 14, wherein the in-vehicle electronic device is further configured to detect that a driver that corresponds to one of the occupants in the vehicle is in a distressed state or a normal state, based on an analysis of a plurality of defined metrics associated with the driver.

18. The vehicle of claim 17, wherein the in-vehicle electronic device is further configured to activate an emergency response mode in the vehicle when the driver is detected in the distressed state and is unresponsive to an audio alert generated in the vehicle.

19. The vehicle of claim 18, wherein the in-vehicle electronic device is further configured to communicate an autonomous mode start signal to an engine control module of the vehicle to cause the vehicle to be automatically driven to a user-specified medical emergency center when the vehicle is diagnosed as okay-to-drive in the emergency response mode.

* * * * *